(12) United States Patent
Miller

(10) Patent No.: US 12,451,919 B2
(45) Date of Patent: Oct. 21, 2025

(54) MODULAR CUSTOMIZABLE RUGGEDIZED PROTECTIVE CASE WITH DETACHABLE SIDEWALL FOR MOBILE DEVICE

(71) Applicant: MobileDemand LC, Hiawatha, IA (US)

(72) Inventor: Matthew D. Miller, Cedar Rapids, IA (US)

(73) Assignee: MobileDemand LC, Hiawatha, IA (US)

( * ) Notice: Subject to any disclaimer, the term of this patent is extended or adjusted under 35 U.S.C. 154(b) by 292 days.

(21) Appl. No.: 18/094,844

(22) Filed: Jan. 9, 2023

(65) Prior Publication Data
US 2023/0163799 A1    May 25, 2023

Related U.S. Application Data

(60) Continuation-in-part of application No. 17/325,621, filed on May 20, 2021, now Pat. No. 11,552,668, (Continued)

(51) Int. Cl.
*H04B 1/3888* (2015.01)
*A45C 11/00* (2006.01)
(Continued)

(52) U.S. Cl.
CPC ............ *H04B 1/3888* (2013.01); *A45C 11/00* (2013.01); *A45C 13/26* (2013.01); *G06F 1/1626* (2013.01);
(Continued)

(58) Field of Classification Search
CPC ........... G06F 1/1626; G06F 2200/1633; G06F 1/1628; G06F 1/1632; G06F 1/1669; G06F 3/0202; G06F 1/1654; G06F 2200/1634; G06F 1/1656; G06F 1/1681; G06F 1/263; G06F 1/16; G06F 1/1616; G06F 1/1633; G06F 1/1643; G06F 1/166; G06F 1/1662; G06F 2200/1632; G06F 2203/04809; A45C 11/00; A45C 2011/003; A45C 2011/002; A45C 2200/15; A45C 13/002; A45C 2011/001; A45C 11/24; A45C 13/005; A45C 13/001; A45C 13/04; A45C 13/30; A45C 15/00; A45C 2001/065; A45C 2200/10; A45C 5/02; H04M 1/185;
(Continued)

(56) References Cited

U.S. PATENT DOCUMENTS

| 5,933,812 A | 8/1999 | Meyer et al. |
| 7,249,978 B1 | 7/2007 | Ni |

(Continued)

*Primary Examiner* — Golam Sorowar
(74) *Attorney, Agent, or Firm* — Suiter Swantz IP

(57) ABSTRACT

A modular ruggedized protective case for a mobile communications device is disclosed. In embodiments, the protective case includes a flexible (e.g., rubberized) primary housing partially enclosing the mobile device and itself partially surrounded or enclosed by a rigid secondary housing. The secondary housing includes a removable sidewall conformable and contourable to the housing to protect and conceal connector ports for a peripheral keyboard. The sidewall may be detached from the secondary housing to allow the keyboard to be connected to the mobile communications device via the connector ports, eliminating the need for an external adapter attached to the secondary housing.

9 Claims, 21 Drawing Sheets

Related U.S. Application Data which is a division of application No. 16/511,740, filed on Jul. 15, 2019, now Pat. No. 11,031,968, which is a continuation of application No. 16/029,128, filed on Jul. 6, 2018, now Pat. No. 10,355,731, which is a continuation-in-part of application No. 15/422,239, filed on Feb. 1, 2017, now Pat. No. 10,021,237.

(60) Provisional application No. 62/289,822, filed on Feb. 1, 2016.

(51) Int. Cl.
| | |
|---|---|
| *A45C 13/26* | (2006.01) |
| *G06F 1/16* | (2006.01) |
| *H04M 1/02* | (2006.01) |
| *H04M 1/72409* | (2021.01) |
| *H04M 1/72412* | (2021.01) |

(52) U.S. Cl.
CPC .......... *G06F 1/1632* (2013.01); *G06F 1/1656* (2013.01); *H04M 1/0202* (2013.01); *H04M 1/724092* (2022.02); *A45C 11/002* (2025.01); *H04M 1/72412* (2021.01)

(58) Field of Classification Search
CPC .... H04M 1/0202; H04M 1/04; H04M 1/0214; H04M 1/18; H04M 1/23; H04M 1/72575; H04M 1/0235; H04M 1/0252; H04M 1/0256; H04M 1/026; H04M 1/0279; H04M 1/0283; H04M 1/236; H04M 1/72519; H04M 1/72527

See application file for complete search history.

(56) References Cited

U.S. PATENT DOCUMENTS

| | | | |
|---|---|---|---|
| 9,438,295 | B1 | 9/2016 | Song |
| 10,355,732 | B2 * | 7/2019 | Wilson ................. H04B 1/3888 |
| 2005/0085278 | A1 | 4/2005 | Lin |
| 2007/0051808 | A1 | 3/2007 | Adams et al. |
| 2008/0188270 | A1 | 8/2008 | Bjorklund |
| 2010/0262845 | A1 | 10/2010 | Goel |
| 2012/0302288 | A1 | 11/2012 | Bom et al. |
| 2013/0088813 | A1 | 4/2013 | Su et al. |
| 2013/0109316 | A1 | 5/2013 | Lee |
| 2013/0240380 | A1 | 9/2013 | Hansen |
| 2013/0335327 | A1 * | 12/2013 | Solomon ............... G06F 3/0202 345/168 |
| 2014/0049060 | A1 | 2/2014 | Rayner |
| 2014/0152890 | A1 | 6/2014 | Rayner |
| 2014/0262847 | A1 * | 9/2014 | Yang ................... F16M 13/022 206/37 |
| 2015/0061477 | A1 | 3/2015 | Wilson |
| 2015/0062787 | A1 | 3/2015 | Wilson et al. |
| 2015/0201723 | A1 | 7/2015 | Rayner et al. |
| 2015/0214991 | A1 * | 7/2015 | Ranchod ................ H04M 1/18 455/575.8 |
| 2016/0172883 | A1 | 6/2016 | Globerson et al. |
| 2016/0357224 | A1 | 12/2016 | Song et al. |
| 2017/0315591 | A1 * | 11/2017 | Shin ...................... G06F 1/1669 |
| 2018/0060628 | A1 * | 3/2018 | Tien ..................... G06K 7/1413 |
| 2019/0212784 | A1 * | 7/2019 | Oakeson ............... G06F 1/1669 |

* cited by examiner

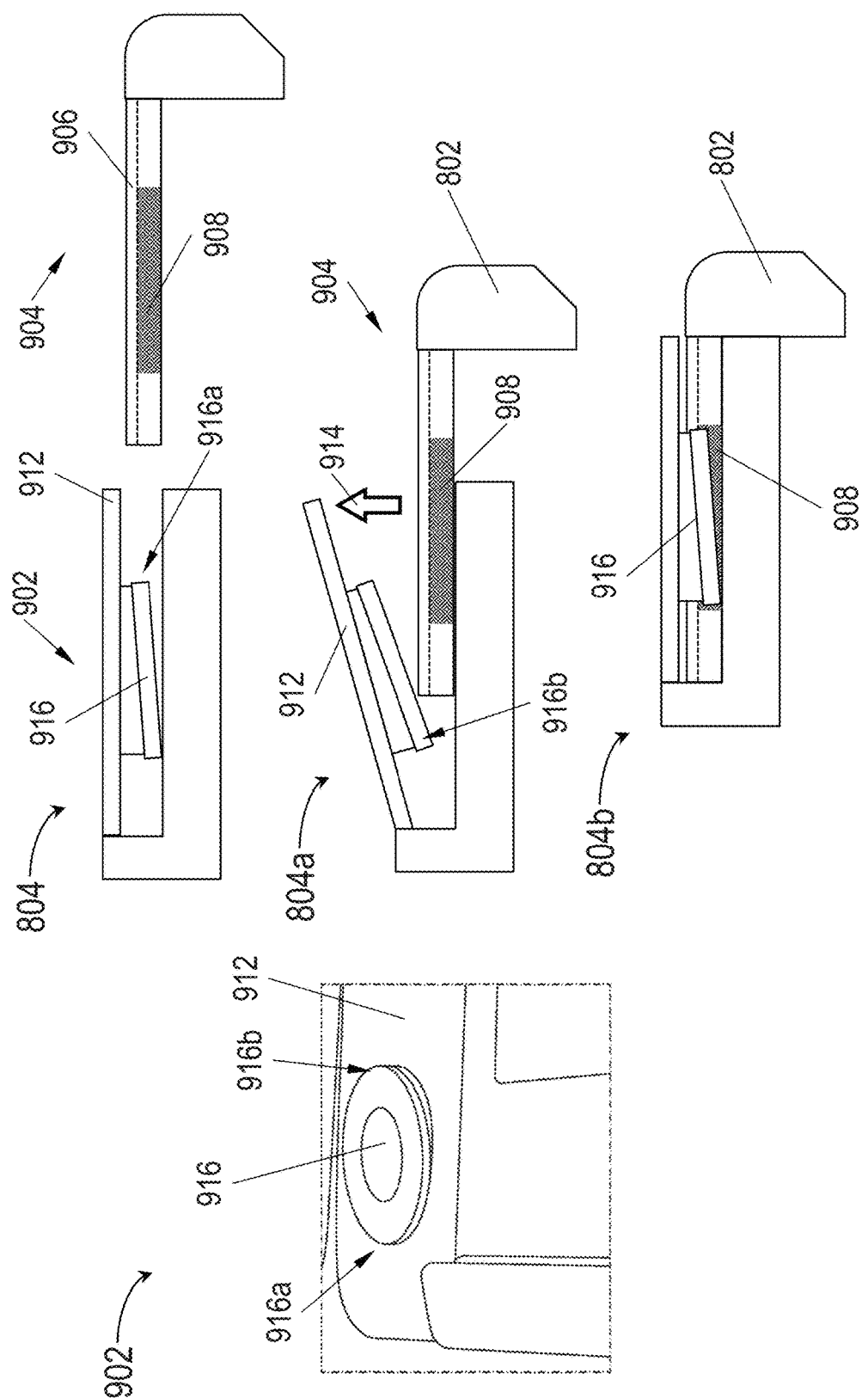

MODULAR CUSTOMIZABLE RUGGEDIZED PROTECTIVE CASE WITH DETACHABLE SIDEWALL FOR MOBILE DEVICE

CROSS-REFERENCE TO RELATED APPLICATIONS

The instant application claims the benefit of priority under 35 U.S.C. § 120 as a continuation-in-part of U.S. patent application Ser. No. 17/325,621 filed May 20, 2021, which application claims the benefit of priority under 35 U.S.C. §§ 119 and/or 120 to:

U.S. patent application Ser. No. 16/511,740 filed Jul. 15, 2019 which claims priority as a divisional of:

U.S. patent application Ser. No. 16/029,128 filed Jul. 6, 2018, which claims priority as a continuation-in-part of:

U.S. patent application Ser. No. 15/422,239 filed Feb. 1, 2017, which claims priority to:

U.S. Provisional Patent Application Ser. No. 62/289,822 filed Feb. 1, 2016.

Said U.S. patent application Ser. Nos. 17/325,621; 16/511,740; 16/029,128; 15/422,239; and 62/289,822 are herein incorporated by reference in their entirety.

BACKGROUND

Mobile communications devices, such as tablets or smartphones, may be vulnerable to significant vibrations and shocks. In addition, if the mobile device is connected to a network via a cable, port, or other physical link, the sustained vibrations and shocks may dislodge the link from its port or even damage both the link and the port. Further, mobile devices may be augmented by the addition of barcode scanning devices and other types of modular or peripheral input devices, but these devices may not be oriented for optimally convenient use; in other words, the operator of the mobile device must use both hands to support or position the mobile device so that such peripheral input devices may be used and may not be able to simultaneously interface with the peripheral device, e.g., via the mobile device.

Finally, some variants of mobile device may be configured with a type cover, e.g., a flexible cover that provides protection for a touch-sensitive display surface of the mobile device but deploys into a variably positionable keyboard. The type cover may be secured to the mobile device in such a way that it may be easily be removed when not in use. However, when the base mobile device is enclosed in a protective housing or case, the reinforced mobile device may not be compatible with the type cover. The protective housing may be fitted with an adapter allowing the type cover keyboard (or another modular keyboard) to be connected to the mobile device, both physically and communicatively (e.g., via connector ports otherwise concealed by the protective housing), such that control input may be provided to the mobile device via the keyboard. However, an exposed type cover adapter may detract from the otherwise contoured surface of the protective housing, damaging other surfaces with which it may come into contact.

SUMMARY

A modular ruggedized protective case incorporating a terminal device housing is also disclosed. In embodiments, the protective case includes a flexible (e.g., rubberized) primary housing partially surrounded or enclosed by a rigid secondary housing, the secondary housing including port protectors for concealing or shielding connector ports (e.g., USB, HDMI, AC outlets) of the mobile device. The rigid secondary housing includes a detachable sidewall portion conforming to the exterior contours of the secondary housing. When attached, the sidewall portion protects and conceals connector ports for a peripheral keyboard. When removed, the keyboard may be attached to the mobile device for normal use.

In some embodiments, the removable sidewall is attached to the secondary housing via snap-on points. For example, each snap-on point includes a sidewall portion (of the sidewall) that engages with a housing portion (of the rigid housing). The sidewall portion includes rails guided into the housing portion by receiving slots, with a hole set into the sidewall portion between the rails and an inner tab matching the hole and extending underneath an outer tab. The inner tab is slanted downward such that when the sidewall portion is inserted into the housing portion, the outer tab extends upward until the hole reaches the rear portion of the inner tab, locking the inner tab into the hole and securing the sidewall to the secondary housing. The sidewall portion may be released from the housing portion by engaging the tab upward to release the inner tab from the hole, whereby the sidewall can be detached (via the sidewall portions) from the rigid housing.

In some embodiments, the removable sidewall is attached to the secondary housing via magnets attached to the interior surface of the sidewall, or otherwise set into the sidewall. The magnets are mutually attracted to complementary magnets set into the secondary housing, such that the sidewall may be secured to the secondary housing once attached (and, in some embodiments, guided into a desired alignment with the secondary housing) by the paired magnets.

In some embodiments, the removable sidewall includes an external type cover adapter, allowing attachment and use of a peripheral keyboard without removing the sidewall. The type cover adapter may connect to the connector ports concealed by the removable sidewall to allow keyboard signals to travel from the keyboard to the mobile device.

In some embodiments, the protective case includes one or more peripheral devices attached to the rear of the rigid secondary housing (e.g., via an external circuit housing attached to the rear face of the secondary housing) and controllable via the mobile device.

In some embodiments, the peripheral devices include a rear-mounted barcode scanner capable of generating auditory alerts, e.g., indicative of a successful or unsuccessful scanning operation.

In some embodiments, the peripheral device includes an external speaker for providing the auditory alerts.

In some embodiments, the protective case includes a modular communications hub attached to the rigid secondary housing. For example, the communications hub may be a USB 3.0/USC-B hub including external USB3/USC-B ports allowing high speed data connections to the mobile device by the external peripheral devices. For example, if the mobile device incorporates only legacy USB ports, USB3 or USB-C devices may connect to the communications port via external cable, allowing both operating power and high-speed data to travel via the external cable.

In some embodiments, the protective case includes a peripheral camera mount including a three-dimensional (3D) imager removably attachable to the rear face of the rigid secondary housing. For example, the peripheral camera mount may be configured for quick and simplified attachment to, and removal from, the secondary housing. If the mobile device is not otherwise equipped with a 3D imaging system, the peripheral camera mount may be temporarily attached to the secondary housing and the 3D imager connected to the communications hub (e.g., USB-C cable), allowing for high-speed data transfer to the mobile device (e.g., 3D imaging data or high-resolution video). The peripheral camera mount may be attached so that the field of view of the 3D imager aligns substantially with the field of view of an existing camera (e.g., 2D camera) of the mobile device, and detached from the secondary housing to allow for unobstructed use of the 2D camera.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 9F is a detailed view of a housing portion of the snap-on points of FIG. 9A;

FIG. 9G is a multi-stage diagrammatic profile view of the attachment/detachment process of FIG. 9A;

DETAILED DESCRIPTION

Figure 1:
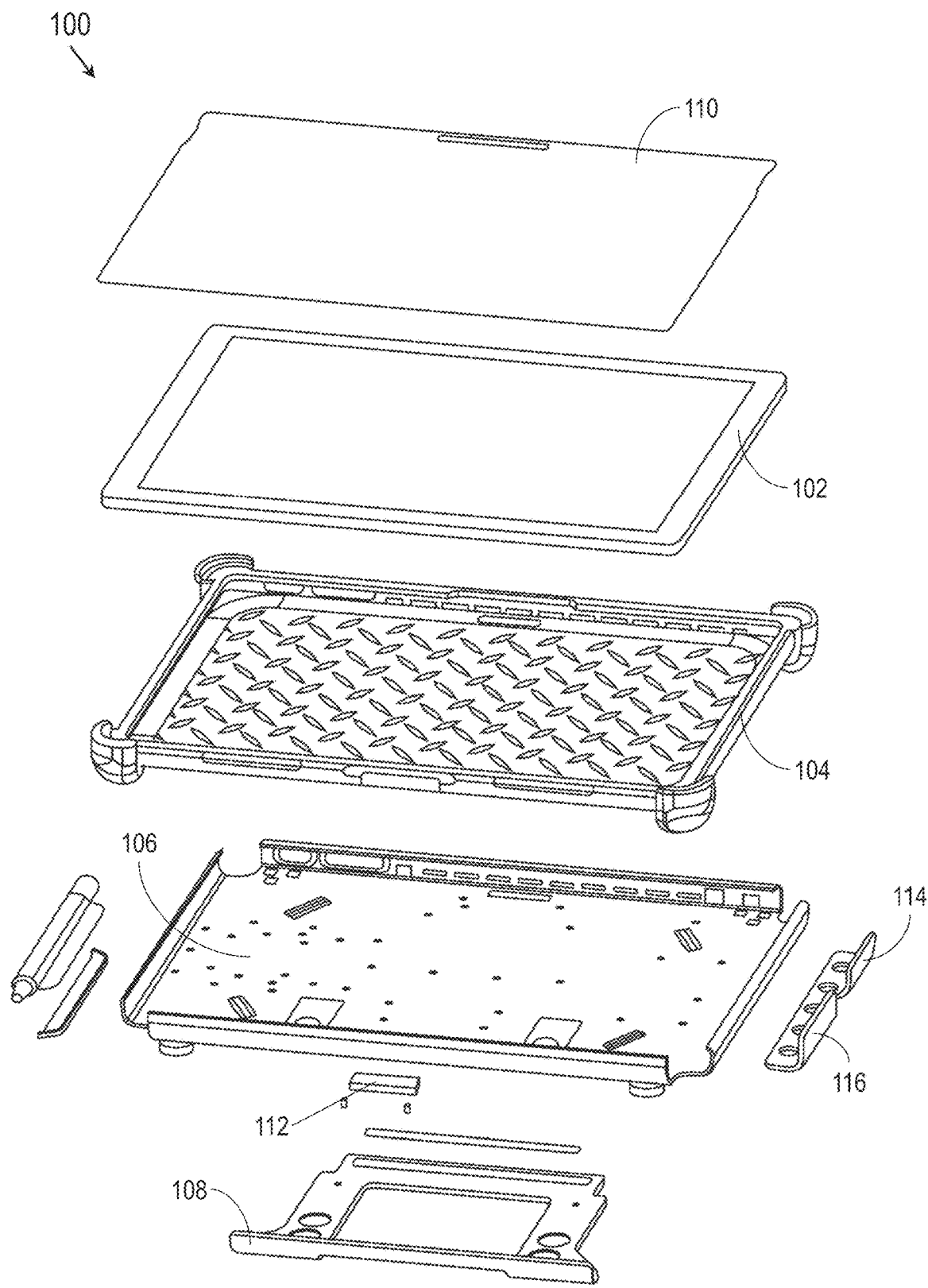
FIG. 1 is an exploded view illustrating a modular ruggedized protective case in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Referring to FIG. 1, a modular ruggedized protective case 100 for a mobile device 102 (e.g., a mobile communication or computing device incorporating processors; a tablet or phablet) is disclosed. In embodiments, the protective case 100 may include a primary housing 104, a secondary housing 106, a kickstand 108, a screen protector 110, a type cover keyboard, and a type cover adapter 112.

In embodiments, the primary housing 104 may be fashioned of a flexible material, e.g., a rubber or rubberized material having a Shore durometer rating between A50 and A80, or more particularly Shore A60 silicone rubber. The primary housing 104 and case housing 106 may substantially enclose the exterior edges and rear face of the mobile device 102, excepting openings or apertures sized and positioned to provide access to connector ports (e.g., USB, HDMI, serial, parallel, Thunderbolt, Surflink, AC connection ports). The primary housing 104 may include port protectors 114, 116, e.g., repositionable flaps or tabs covering the connector ports but repositionable for the connection of a cable, cord, or portable storage device to the connector ports.

In embodiments, the secondary housing 106 may partially enclose the primary housing 104. The secondary housing 106 may be fashioned of a molded rigid high impact material, e.g., molded polycarbonate, acrylonitrile butadiene styrene (ABS), or an ABS/polycarbonate alloy.

Figure 2:
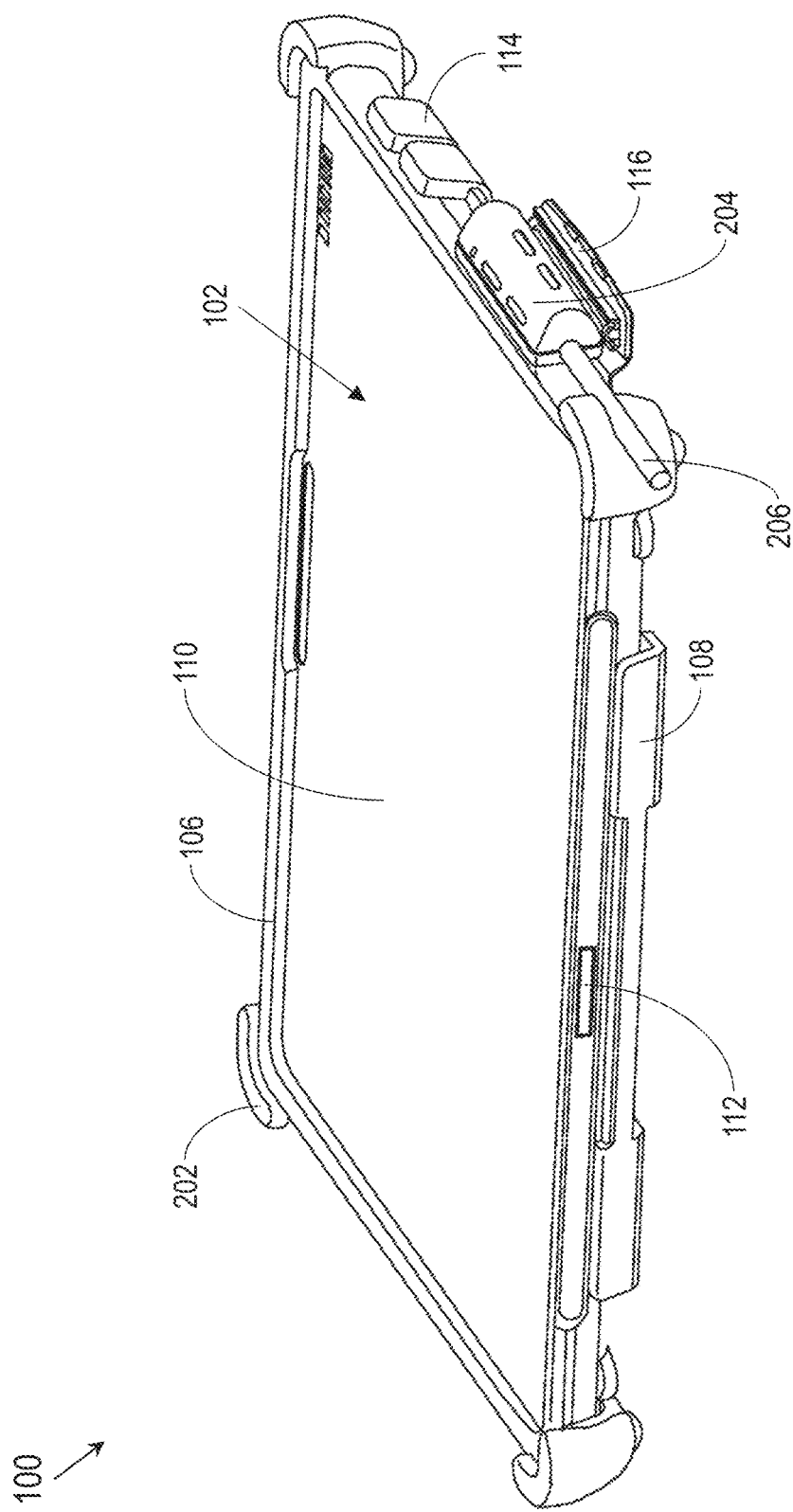
FIG. 2 is an overhead perspective view illustrating the modular ruggedized protective case of FIG. 1.

Referring to FIG. 2, the modular ruggedized protective case 100 is disclosed. In embodiments, the primary housing 104 may include reinforced corners 202 providing additional shock absorption for the corners and entirety of the mobile device 102. The port protectors 114, 116 may be repositionable to accommodate and secure an external connector carriage 204 to the protective case. The external connector carriage 204 may incorporate one or more power or data connectors (or both) compatible with connector ports of the mobile device (102, FIG. 1). For example, the external connector carriage 204 may supply the mobile device 102 with power or connect the mobile device to another device via a connector cable 206.

Figure 3A:
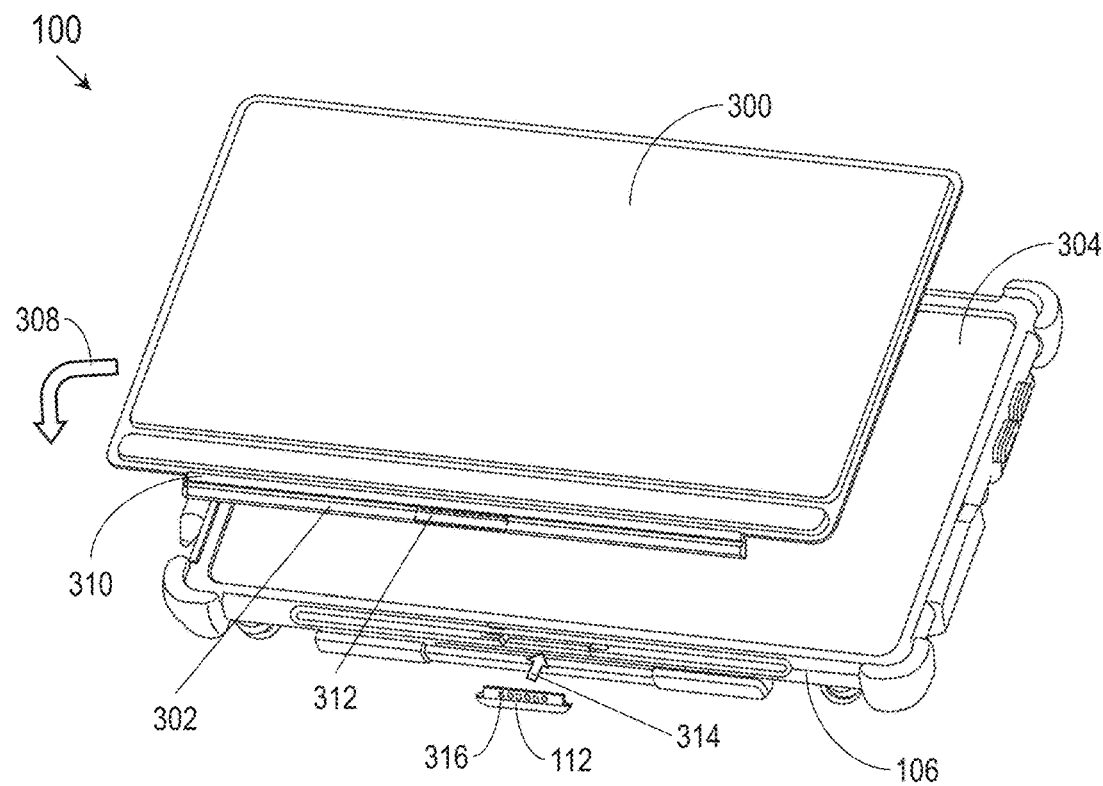
FIG. 3A is a partially exploded view illustrating a type cover keyboard and adapter of the modular ruggedized protective case of FIG. 1.
Figure 3B:
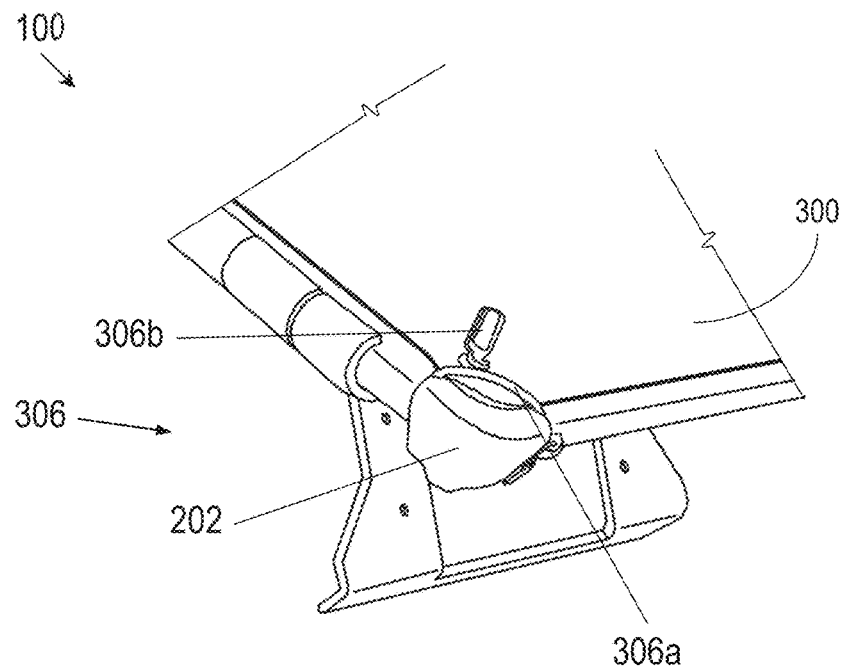
FIG. 3B is a detailed isometric view of a secured corner of the modular ruggedized protective case of FIG. 3A.

Referring to FIGS. 3A and 3B, the modular ruggedized protective case 100 is disclosed. In embodiments, the type cover keyboard 300 may removably attach to the mobile device (102, FIG. 1) via a magnetic strip 302 (e.g., series of magnets) extending along a long edge of the type cover keyboard 300, the magnetic strip aligned with, and attractable to, complementary magnets inside the secondary housing 106. The type cover keyboard 300 may substantially cover a display surface 304 (e.g., touchscreen) of the mobile device 102 when in a closed orientation. Referring in particular to FIG. 3B, the modular ruggedized protective case 100 may include corner loops 306 for holding the type cover keyboard 300 in place. For example, the corner loops 306 may include spring-loaded cables 306a extendable around the reinforced corners 202 of the type cover keyboard 300 via corner tabs 306b. From this closed orientation, the type cover keyboard 300 may be deployed, rotating (308) around a lengthwise crease or joint 310 between the magnetic strip 302 and the type cover to reveal a keypad on its internal surface, e.g., the surface facing the display surface 304 of the mobile device 102 when in the closed orientation.

In embodiments, the type cover keyboard 300 may incorporate type cover connectors 312 on the internal surface of the magnetic strip 302. For example, the type cover connectors 312 connect to a set of contacts (not shown) on the exterior edge of the mobile device 102, and through this connection enable control input submitted by a user via the keypad of the type cover 110 to reach the mobile device 102 for processing. However, the secondary housing 106 may impede the type cover connectors 312 and contacts of the mobile device 102 from connecting. The type cover adapter 112 may attach (314) to the secondary housing 106 and incorporate adapter contacts 316 which connect to the mobile device contacts through the type cover adapter and make external contact with the type cover connectors 312, allowing full functionality of the type cover keyboard 300 when the mobile device 102 is protected by the modular ruggedized protective case 100. In some embodiments, the modular ruggedized protective case 100 may fully integrate the type cover adapter 112 into the case housing (e.g., into the secondary housing 106) rather than via an attachable adapter.

Figure 4A:
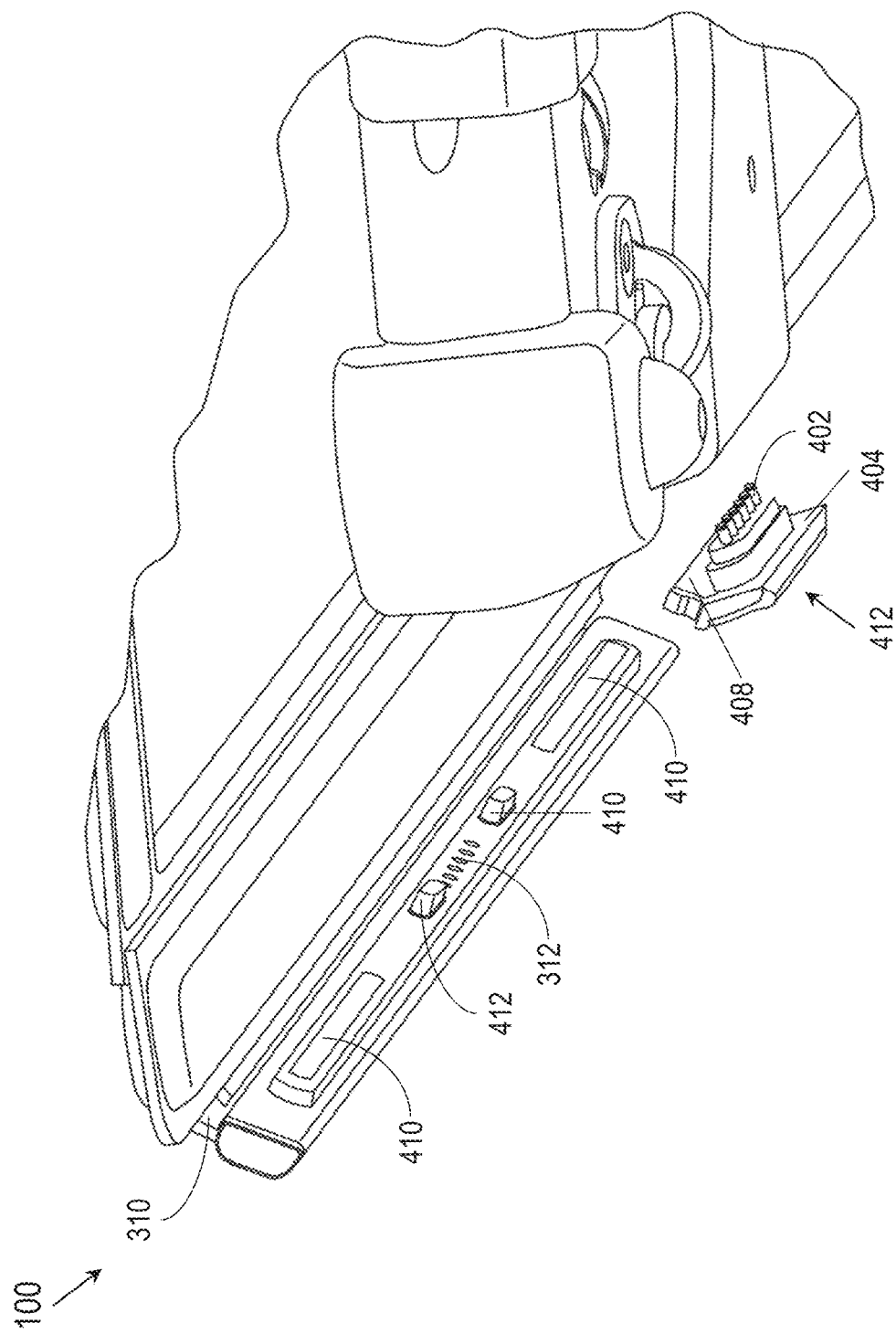
FIG. 4A is an underside partially exploded view illustrating the modular ruggedized protective case and type cover adapter of FIG. 1.
Figure 4B:
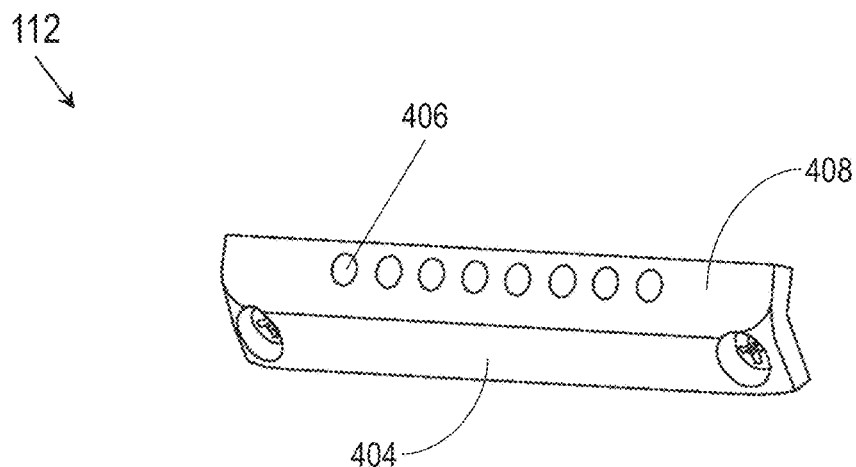
FIGS. 4B and 4C are detail views of the type cover adapter of FIG. 1.
Figure 4C:
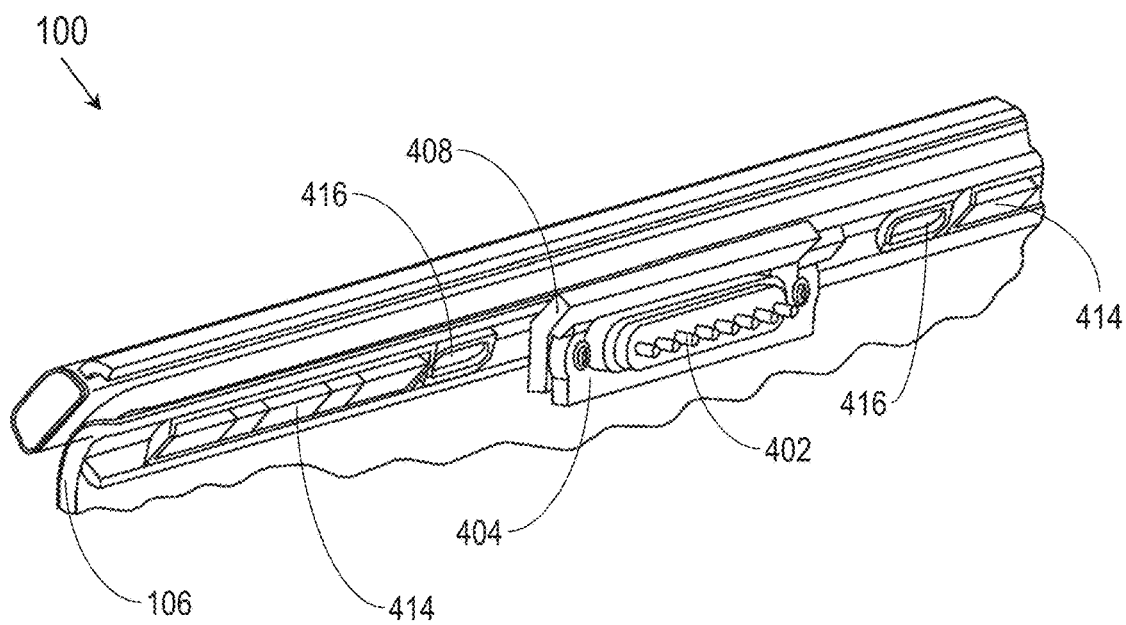

Referring to FIGS. 4A through 4C, the modular ruggedized protective case 100 and the type cover adapter 112 are disclosed. In embodiments, the type cover adapter 112 may be screwed, bolted, or otherwise fastened to the exterior of the protective case (e.g., to the secondary housing (106, FIG. 3)) such that the contact pins 402 set into the lower portion 404 of the type cover adapter may be set into the contact slots (not shown) of the mobile device (102, FIG. 1) wherein the type cover connectors 312 would normally fit to preserve a connection between the type cover keyboard (110, FIG. 3A) and the mobile device 102. The contact pins 402 may in turn be connected through the body of the type cover adapter 112 to auxiliary connectors 406 (e.g., auxiliary pins) set into the upper portion 408 of the type cover adapter. For example, when the type cover keyboard 300 is attached to the protective case 100 and the mobile device 102 enclosed therein, type cover magnets 410 and type cover tabs 412 may respectively complement case magnets 414 (e.g., with attracting polarity which may be alternating) and tab recesses 416 to secure the type cover to the protective case while allowing the type cover to be deployed (e.g., unfolded) along the joint 310. The auxiliary connectors 406 may then be held in contact with the type cover connectors 312, preserving the communicative connection between the type cover 110 and the mobile device 102 through the protective case 100.

Figure 5A:
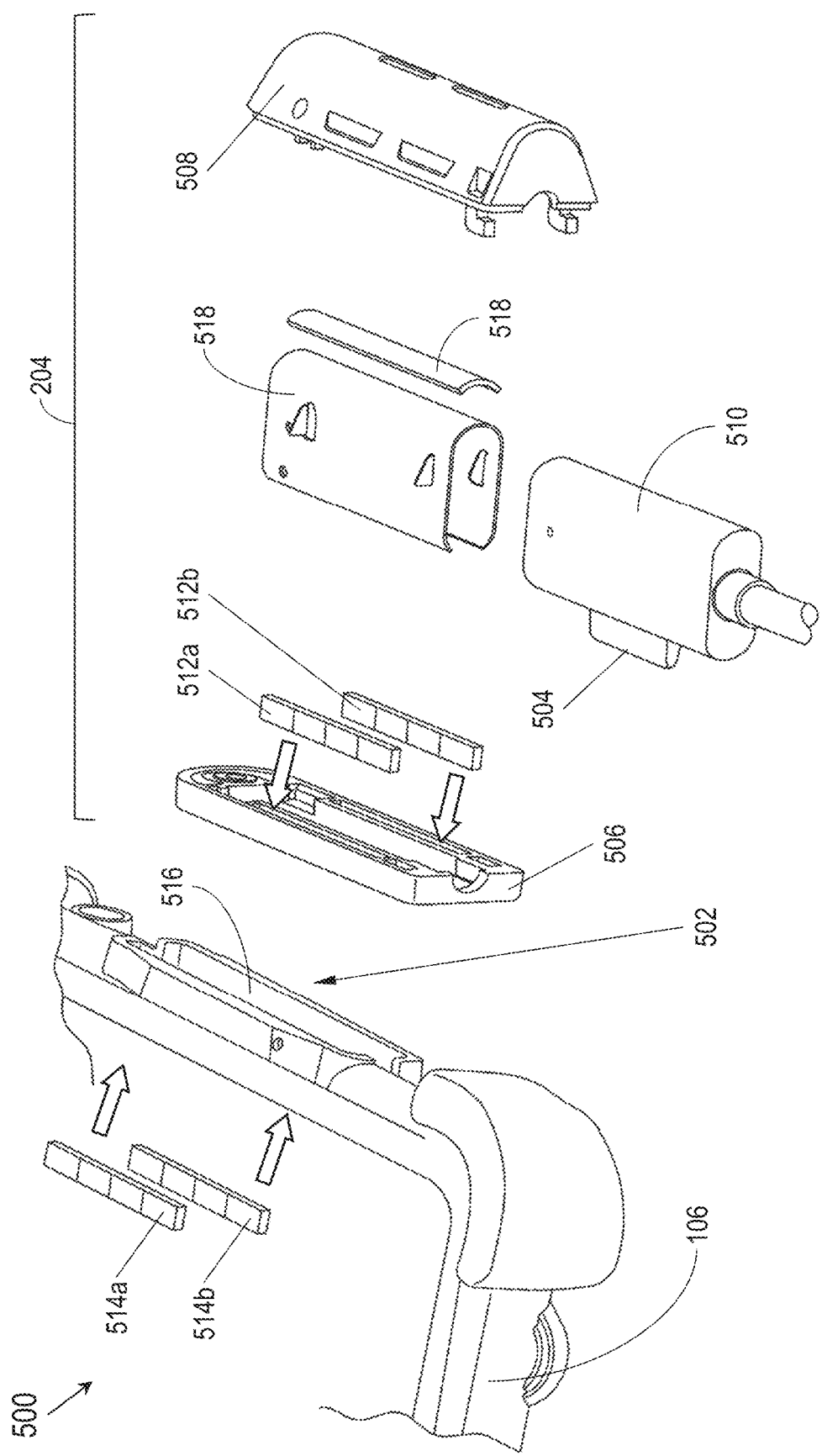
FIGS. 5A and 5B are partially exploded views illustrating a magnetic connector carriage module of the modular ruggedized protective case of FIG. 1.
Figure 5B:
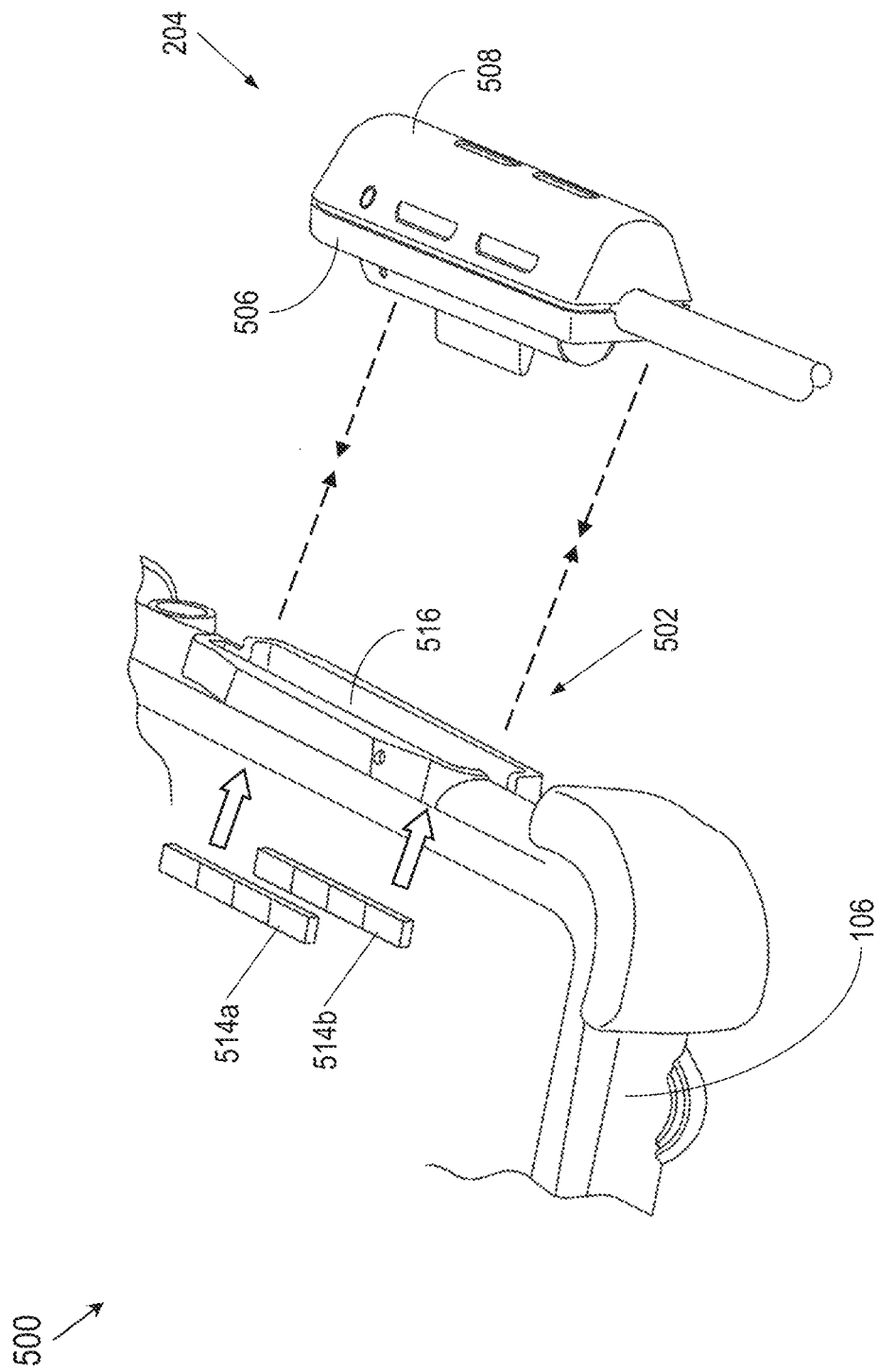

Referring to FIGS. 5A and 5B, a magnetic connector carriage module 500 of the modular ruggedized protective case 100 (FIGS. 1-4B) is shown. In embodiments, the port cover protector (116, FIG. 2) may fold or rotate downward (e.g., via a hinge or crease) to provide access to the connector port 502 compatible with a connector interface 504 of the external connector carriage 204. The external connector carriage 204 may comprise a lower housing 506 and an upper housing 508 couplable with each other (e.g., snappable, slidable, screwable). The connector interface 504 may include any appropriate type of data or power connector compatible with a connector port of the mobile device (102, FIG. 1), e.g., Surflink, USB, USB-C, HDMI, Thunderbolt, and other types of serial or parallel connector. While conventional external cable connectors may incorporate embedded magnets to attract complementary device magnets (e.g., in the mobile device near the connector), the magnetic connector carriage module 500 may strengthen the connection of the external connector carriage 204 (e.g., via standard magnets embedded in the original device connector (510)) by incorporating complementary sets of magnets 512a-b, 514a-b into, respectively, the external connector carriage 204 and the open slot 516 of the secondary housing 106 (e.g., surrounding the connector port 502 respectively above and below where the connector interface 504 connects to the connector port).

For example, the set of magnets 512a-b may be aligned, with varying and alternating polarity, and inserted into the top and bottom respectively of the lower housing 506 of the connector module carriage 204. The magnets 512a-b may be attracted to the complementary magnets 514a-b embedded in the corresponding top and bottom of the open slot 516 of the modular ruggedized protective case 100 (e.g., of the secondary housing 106), allowing access to the connector port 502 of the mobile device 102.

In embodiments, the attraction of the magnets 512a-b (e.g., set into the lower housing 506 of the external connector carriage 204) to the magnets 514a-b (e.g., embedded on either side of the open slot 516) may draw the external connector carriage 204 toward the secondary housing 106 and in particular toward the open slot 516 and the connector port 502, holding the external connector carriage in alignment with the connector port. In some embodiments, the connector interface 504 may be further bracketed and shielded (518), e.g., to protect a data connection via the connector interface 504 from the magnets 512a-b and other wireless interference within the external housing 508 (and the complementary magnets 514a-b set into the secondary housing 106 adjacent to the open slot 516).

Figure 6:
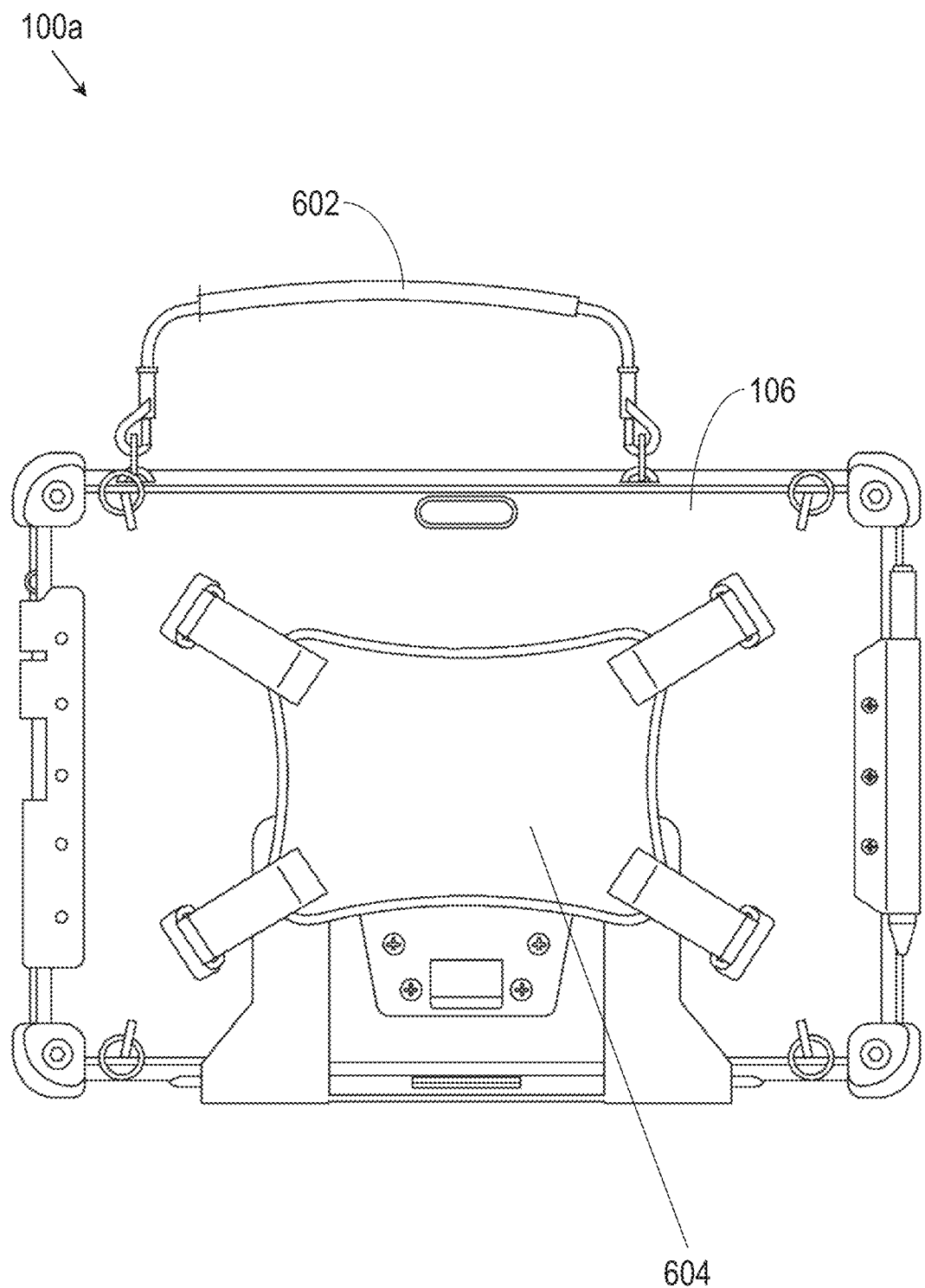
FIG. 6 is a rear view illustrating the modular ruggedized protective case of FIG. 1.

Referring to FIG. 6, the modular ruggedized protective case 100a is shown. In embodiments, the modular ruggedized protective case 100a may be implemented and may function similarly to the modular ruggedized protective case 100 of FIGS. 1 through 5B, except that the modular ruggedized protective case 100a may incorporate a carrying handle 602 and/or strap 604 attached to the secondary housing 106 of the protective case. For example, the carrying handle 602 may provide a means of transporting the modular ruggedized protective case 100a (and the mobile device (102, FIG. 1) enclosed therein) when not in use. Similarly, the strap 604 may allow a user or operator of the mobile device 102 to secure the mobile device in one hand (e.g., like a glove wrapping around the hand) while operating the mobile device (and/or its peripheral devices and applications) with the other hand, e.g., via the touch-sensitive display surface (304, FIG. 3).

Figure 7A:
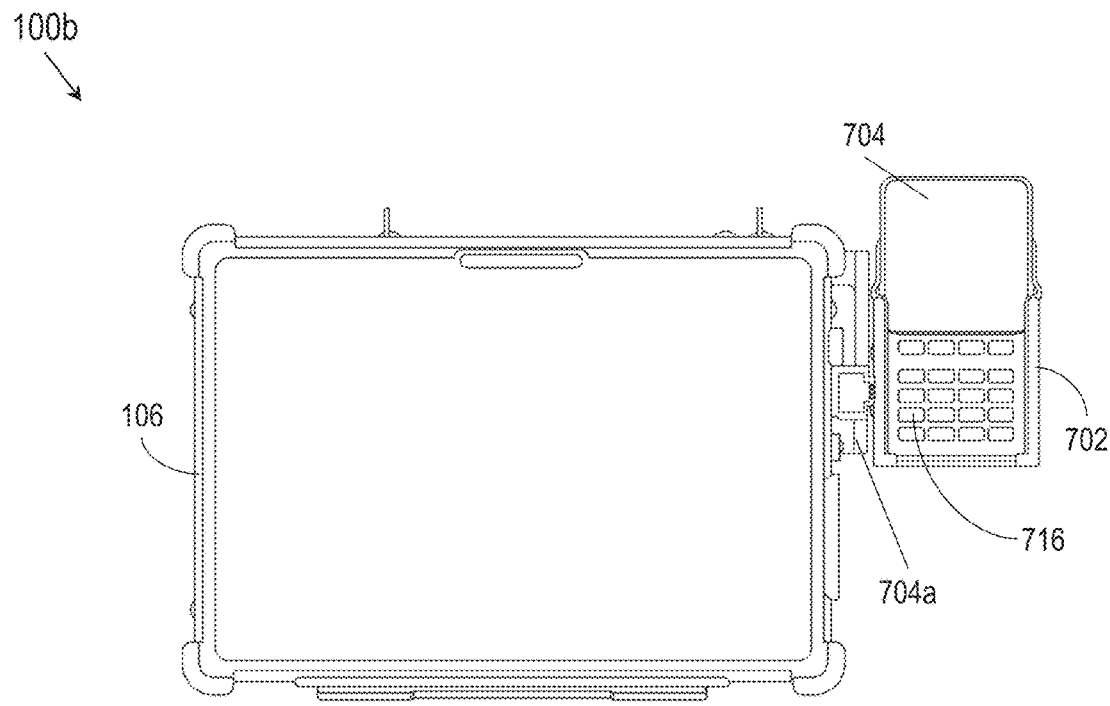
FIG. 7A is a forward view illustrating a modular ruggedized protective case and peripheral device housing in accordance with example embodiments of this disclosure.
Figure 7B:
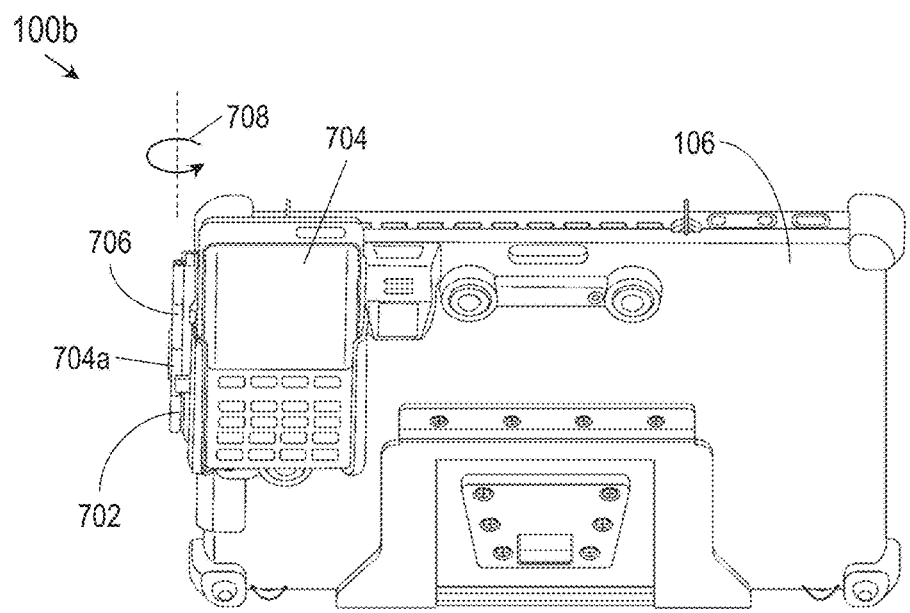
FIG. 7B is a rear isometric view illustrating the modular ruggedized protective case and peripheral device housing of FIG. 7A.

Referring to FIGS. 7A through 7F, a modular ruggedized protective case 100b is disclosed. The modular ruggedized protective case 100b may be implemented and may function similarly to the modular ruggedized protective cases 100, 100a of FIGS. 1 through 6, except that the modular ruggedized protective case 100b may incorporate a peripheral device housing 702 attached to its exterior (e.g., to either side of the secondary housing 106) and capable of securely holding (e.g., with a latch and locking mechanism) a mobile payment terminal device 704 (MTD; e.g., mobile data terminal) for use in conjunction with the mobile communications device 102. The MTD 704 may be securely held by, but removable from, the peripheral device housing 702. For example, the peripheral device housing 702 may be attached to the right side of the protective case 100b, such that the protective case and the mobile device 102 may be secured in the left hand (e.g., via the strap 604, FIG. 6) while the MTD 704 is operated by the right hand. Referring in particular to FIG. 7B, the peripheral device housing bracket 704a may be hinged (706) to allow the MTD 704 in the peripheral device housing 702 to be rotated (708) in the housing away from the display surface 304 of the mobile device 102, e.g., when not in use, or to allow the customer to shield a PIN number entry from the mobile device operator.

Figure 7C:
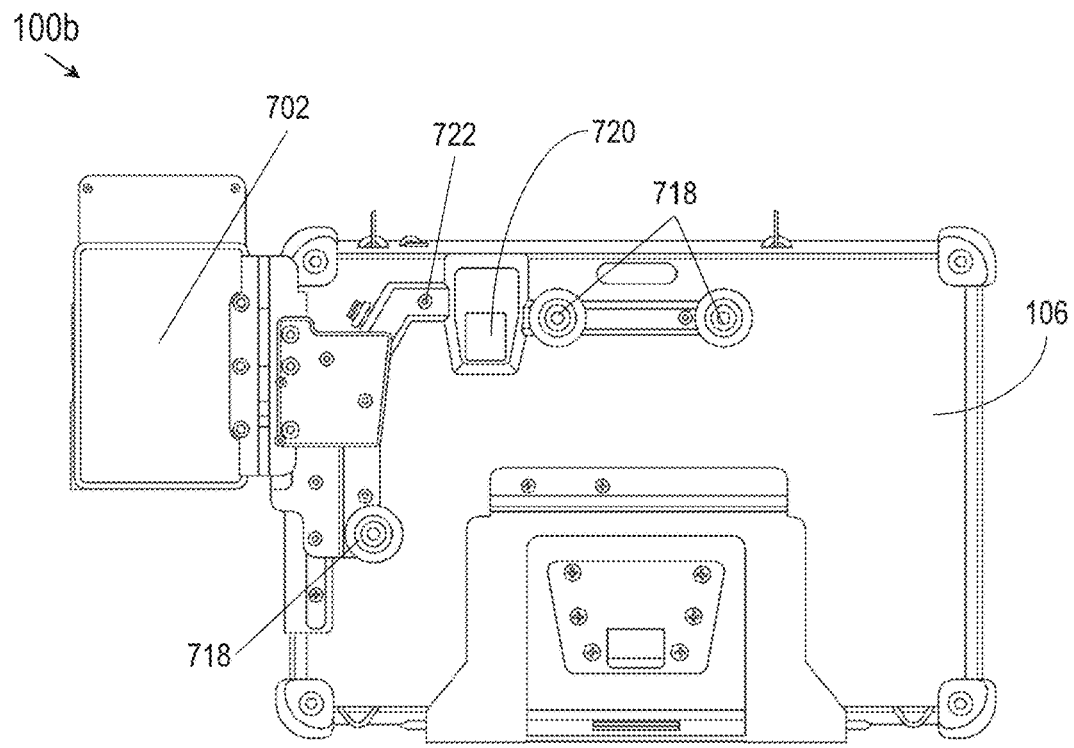
FIG. 7C is a rear view illustrating the modular ruggedized protective case and peripheral device housing of FIG. 7A.
Figure 7D:
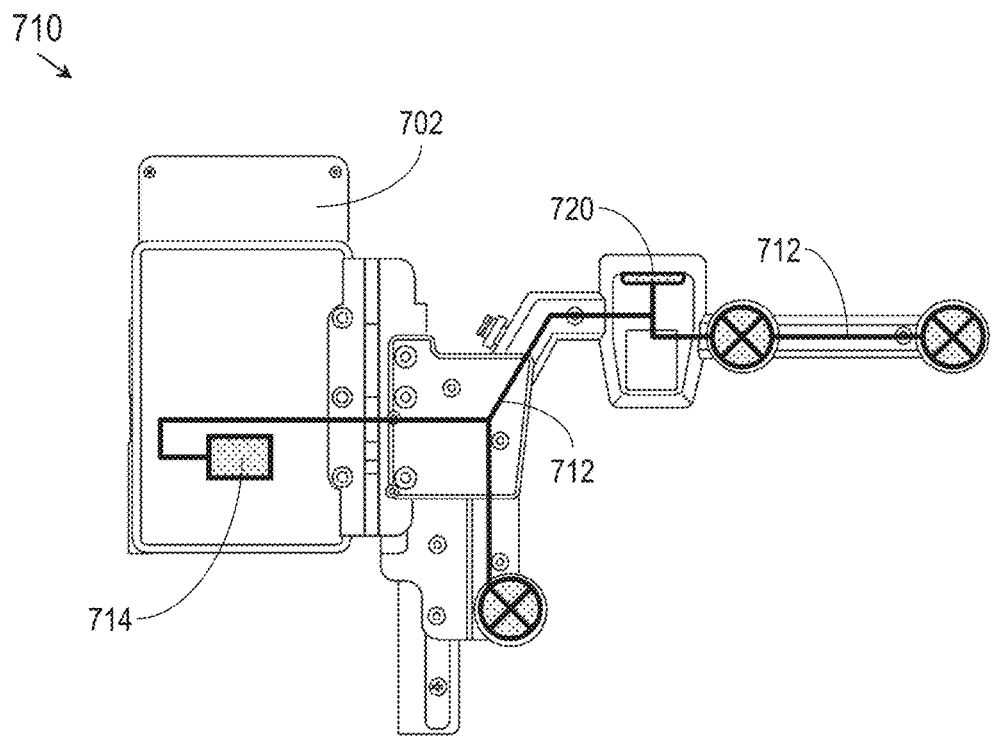
FIG. 7D is a diagrammatic detail view illustrating the peripheral device housing of FIG. 7A.
Figure 7E:
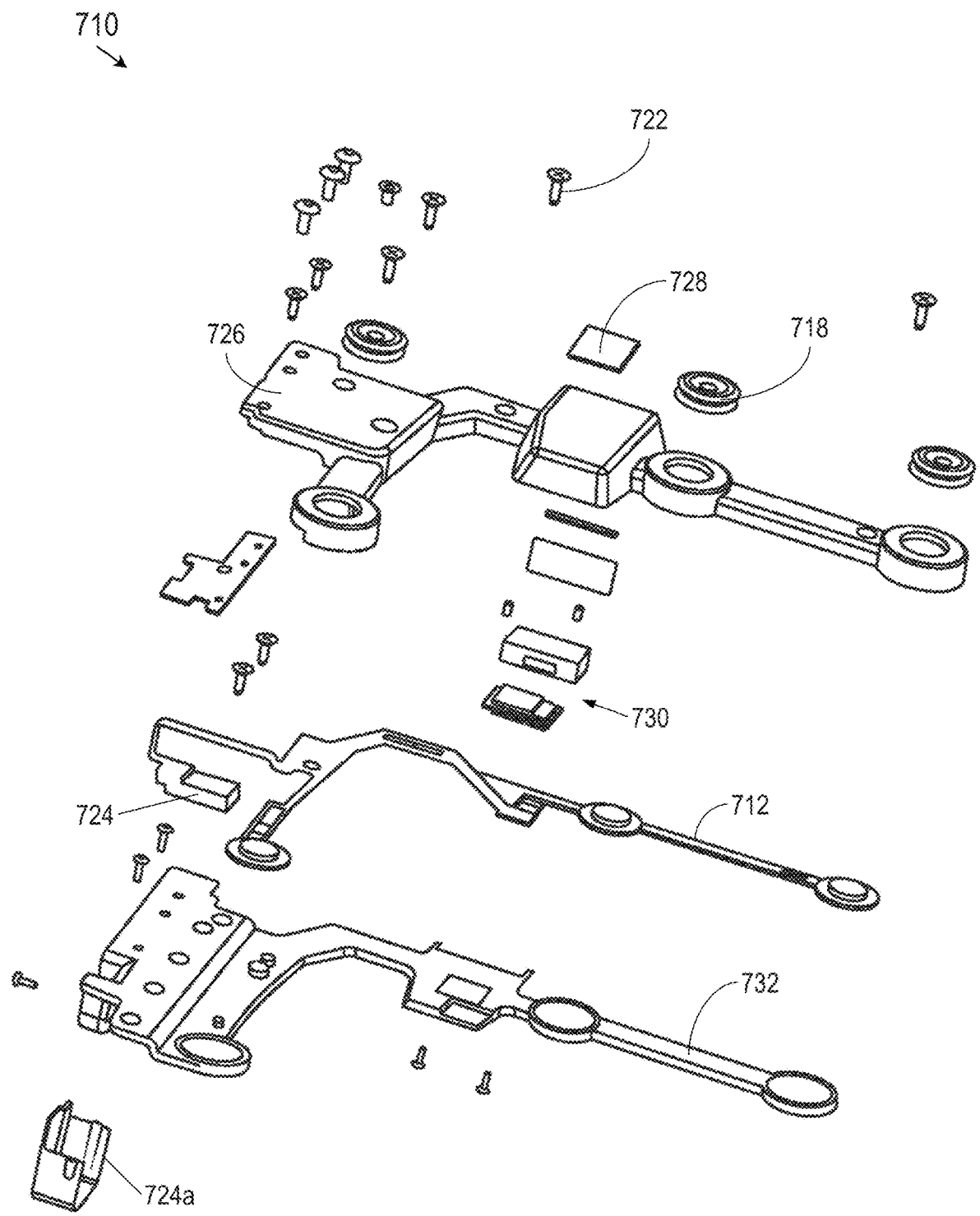
FIG. 7E is an exploded view of a circuit housing of the modular ruggedized protective case of FIG. 7A.

Referring in particular to FIGS. 7C through 7E, the modular ruggedized protective case 100b may incorporate a circuit housing 710 mounted to the rear face of the secondary housing 106. In embodiments, the circuit housing 710 may securely enclose physical connections (e.g., via a flexible cable 712 or circuit assembly) between an MTD interface (714) within the peripheral device housing 702 and the mobile device 102, such that a user supporting the protective case 100b in either hand (e.g., via the strap 604) may operate the MTD 704 with the right hand through its keypad 716 or, alternatively, program particular functions of the MTD to trigger or execute when programmable external buttons 718 in the circuit housing 710 are pressed with the hand supporting the protective case. In some embodiments, the circuit housing 710 may further incorporate a barcode scanning module 720 or other rear-facing peripheral devices.

Referring in particular to FIG. 7E, the circuit housing 710 may be attached to the rear face of the secondary housing 106 by a series of screws (722) into inserts in the secondary housing 106. In some embodiments, the barcode scanning module 720 may be separate and distinct from the circuit housing 106 but may attach flush thereto. The circuit housing 710 may interface with the mobile device 102 (FIG. 1) via a standard communication port (e.g., a USB port, or communication port accessible behind a port protector (114, FIG. 1). For example, the barcode scanning module 720 may interface with the communication port via the circuit housing 710 and the flexible cable 712 and cable connector 724 secured at a right angle within the external housing 726 of the barcode scanning module, such that the flexible cable is protected (724a) yet remains compact. In embodiments, the external housing 726 of the circuit housing 710 may include one or more assemblies connected by the flexible cable 712, e.g., the barcode scanner module 720 and MTD 704. For example, the external housing 726 may include a lens window 728 for transparent protection of the emitters and sensors (730) of the barcode scanner module 720.

In embodiments, the circuit housing may include a substantially flat base 732 that affixes flush to the secondary housing 106 and to the flexible cable 712 for the interface rests. The external housing 726 may then attach over the flexible cable 712 and base 732. In embodiments, initiation of barcode scanning operations may be achieved via a switching mechanism activated by the programmable external buttons 718 capable of communicating control input to the barcode scanner 720. For example, the external buttons 718 may be hard plastic or rubber coated, with tactile shapes and features (e.g., dimples) allowing the operator to blindly find or identify the center of a particular button 718 while holding the mobile device 102 within the modular ruggedized protective case 100b (see, e.g., FIG. 6 and accompanying text above). The external buttons 718 may be placed so as to be able to trigger the barcode scanner 720 when activated by fingers of either the left or right hand while holding the mobile device 102 with that hand, or while fingers from that hand inserted into the glove fitting hand strap (604, FIG. 6). In some embodiments, barcode scanner operations may also be triggered by audible prompt (e.g., voice recognition) or via software button on the display surface (304, FIG. 3) of the mobile device 102. In some embodiments, the circuit housing 710 may incorporate several layers of component secured by a single screw or fastener, whereby a plastic base 732, flexible cable 712 or circuit assembly, scanner optics and decoder (730), and plastic external housing (726; including the lens window 728) are attachable to the secondary housing 106 (e.g., via screws into a particular set of screw holes in the rear face of the secondary housing).

Figure 7F:
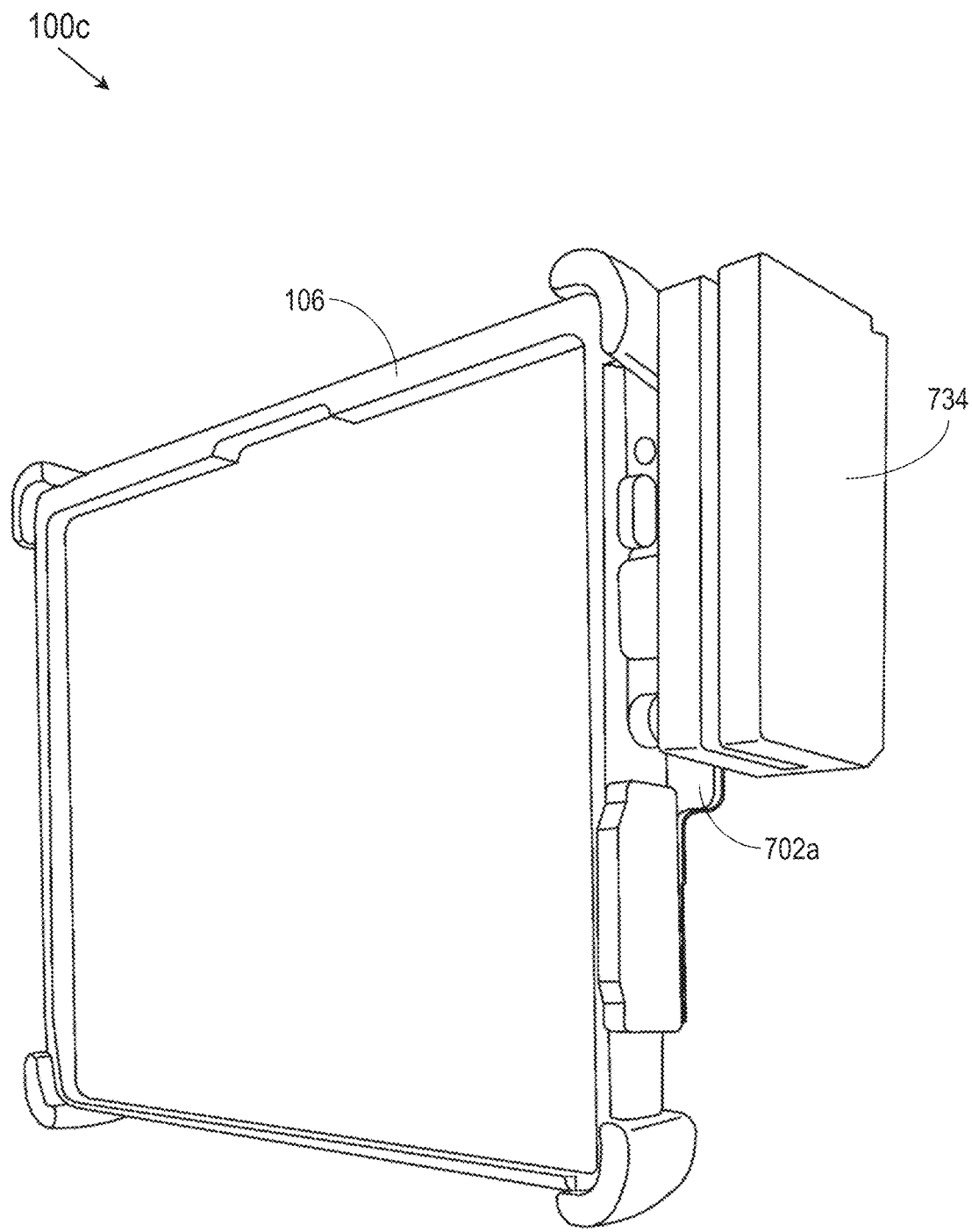
FIG. 7F is a right-side isometric view illustrating a modular ruggedized protective case and peripheral device housing in accordance with example embodiments of this disclosure.

Referring in particular to FIG. 7F, a modular ruggedized protective case 100c and peripheral device housing 702a are disclosed. The modular ruggedized protective case 100c and peripheral device housing 702a may be implemented and may function similarly to the modular ruggedized protective case 100b and peripheral device housing 702 of FIGS. 7A-E, except that the screw holes peripheral device housing 702a may incorporate other types of mobile data terminal devices in addition to the MTD 704. For example, in embodiments, the peripheral device housing 702a may accommodate a card reader 734 (e.g., magnetic strip reader) for reading and collecting data from cards equipped with magnetic strips or chips.

Figure 8A:
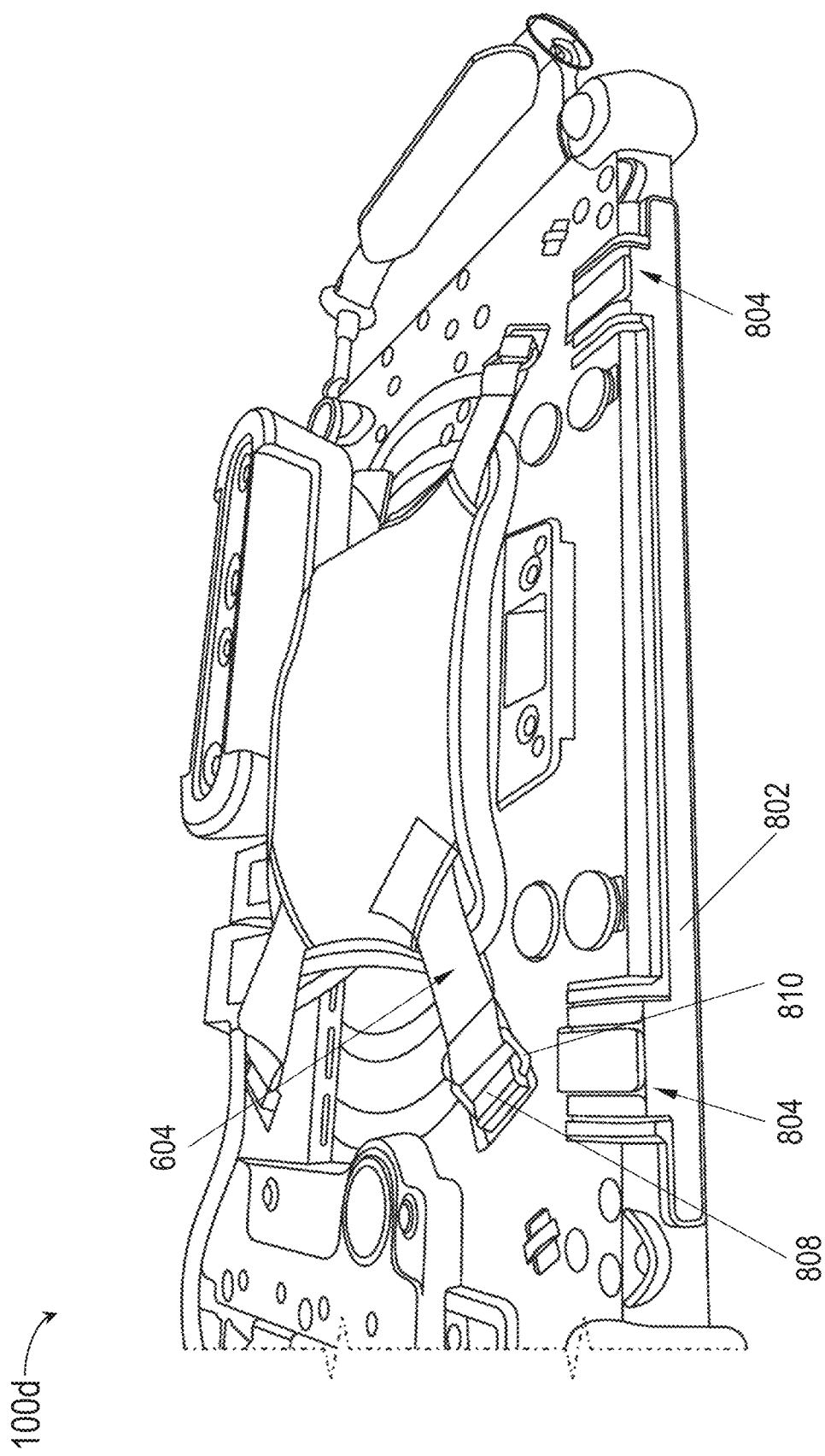
FIG. 8A is an external view of a modular ruggedized protective case including a removable sidewall portion.

Referring in particular to FIG. 8A, the modular ruggedized protective case 100d may be implemented and may function similarly to the modular ruggedized protective cases 100, 100a-100c of FIGS. 1 through 7F, except that the modular ruggedized protective case 100d may incorporate a removable sidewall 802 (e.g., snap wall, removable sidewall portion). For example, the removable sidewall 802 may attach to, and detach from, the ruggedized protective case 100d via one or more snap-on points 804, as described in greater detail below. In some embodiments, the removable sidewall 802 may magnetically attach to the secondary housing 106, e.g., the snap wall incorporating one or more magnets or a magnetic strip (not shown) attached to or set within the snap wall and compatible with complementary magnets within the secondary housing 106. Further, low-profile snap-on points 804 may be utilized such that the removable sidewall 802 substantially contours or conforms externally to the secondary housing 106 as seamlessly as is practical. Likewise, in embodiments the removable sidewall 802 may be fashioned of the same substantially rigid materials as the secondary housing 106.

In embodiments, the modular ruggedized protective case 100d may incorporate low-profile hook points 808 for attachment of the hand strap 604. For example, the hook points 808 may include an indentation for insertion of a D-ring 810 attached to the hand strap 604, the D-ring secured by a hook substantially flush with the rear face of the secondary housing 106. In embodiments, the low-profile hook points 808 may reduce the amount of rigid material necessary for the secondary housing 106 and thus reduce the overall weight of the modular ruggedized protective case 100d. Further, the low-profile hook points 808 may be compatible with any device capable of attaching the hand strap 604 to the modular ruggedized protective case 100d (i.e., D-rings 810).

Figure 8B:
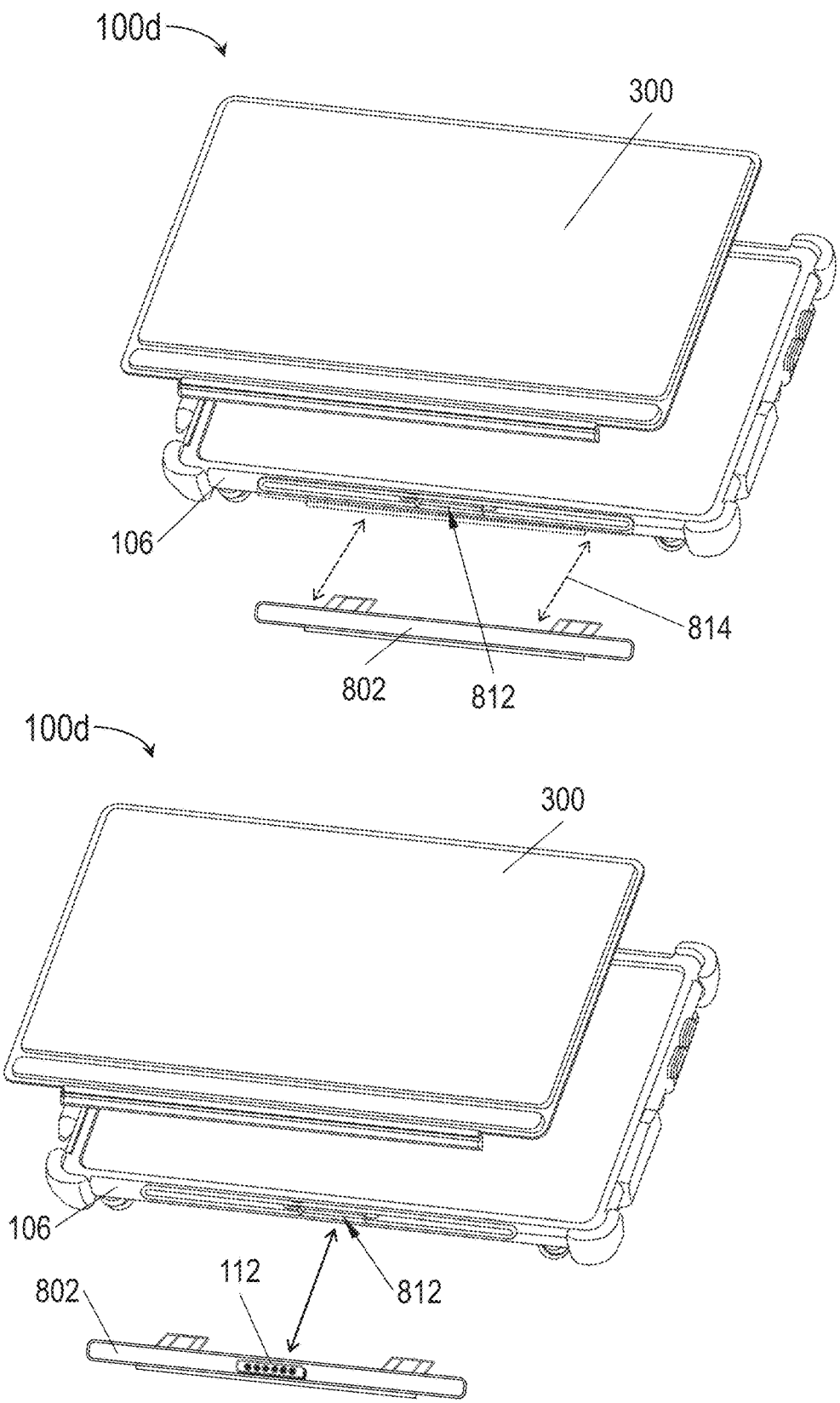
FIG. 8B is a view of the modular ruggedized protective case of FIG. 8A with the removable sidewall detached from the protective case, allowing for peripheral keyboard use either directly through the device connector ports or through an external adapter of the removable sidewall portion.

Referring now to FIG. 8B, in embodiments detachment of the removable sidewall 802 may allow use of the type cover keyboard 300 with the modular ruggedized protective case 100d without a type cover adapter (112, FIG. 3A). For example, the removable sidewall 802 may, when attached to the secondary housing 106, conceal and protect connector ports 812 for the peripheral keyboard set into the mobile device (102, FIG. 1) such that when the snap wall is detached (814) the type cover keyboard 300 may be directly attached to the mobile device and used to provide control input. For example, the type cover keyboard 300 may connect to the mobile device 102 communicatively via type cover adapters (312, FIG. 4A) pluggable into the connector ports 812 of the mobile device, and physically via type cover tabs (412, FIG. 4A) and/or type cover magnets (410, FIG. 4A). In some embodiments, the removable sidewall 802 may itself include an external type cover adapter 112 which connects to the connector ports of the mobile device 102 through the removable sidewall, allowing connection and use of the type cover keyboard 300 without detaching the removable sidewall from the secondary housing 106.

Referring generally to FIGS. 9A through 9K, the modular ruggedized protective case 100d, secondary housing 106, removable sidewall 802, and snap-on points 804 are shown. Each snap-on point 804 may comprise a housing portion 902, e.g., a portion attached to or component of the secondary housing 106, and a sidewall portion 904, e.g., a portion attached to or component of the removable sidewall 802.

In embodiments, the removable sidewall 802 may be attached to, and detached from, the secondary housing 106 via snap-on points 804. For example, referring in particular to FIGS. 9B and 9C, the sidewall portion 904 may include rails 906 on either side of a hole 908 extending through the sidewall portion. In some embodiments, the hole 908 may be round or elliptical; in other embodiments the hole may be differently shaped.

Figure 9A:
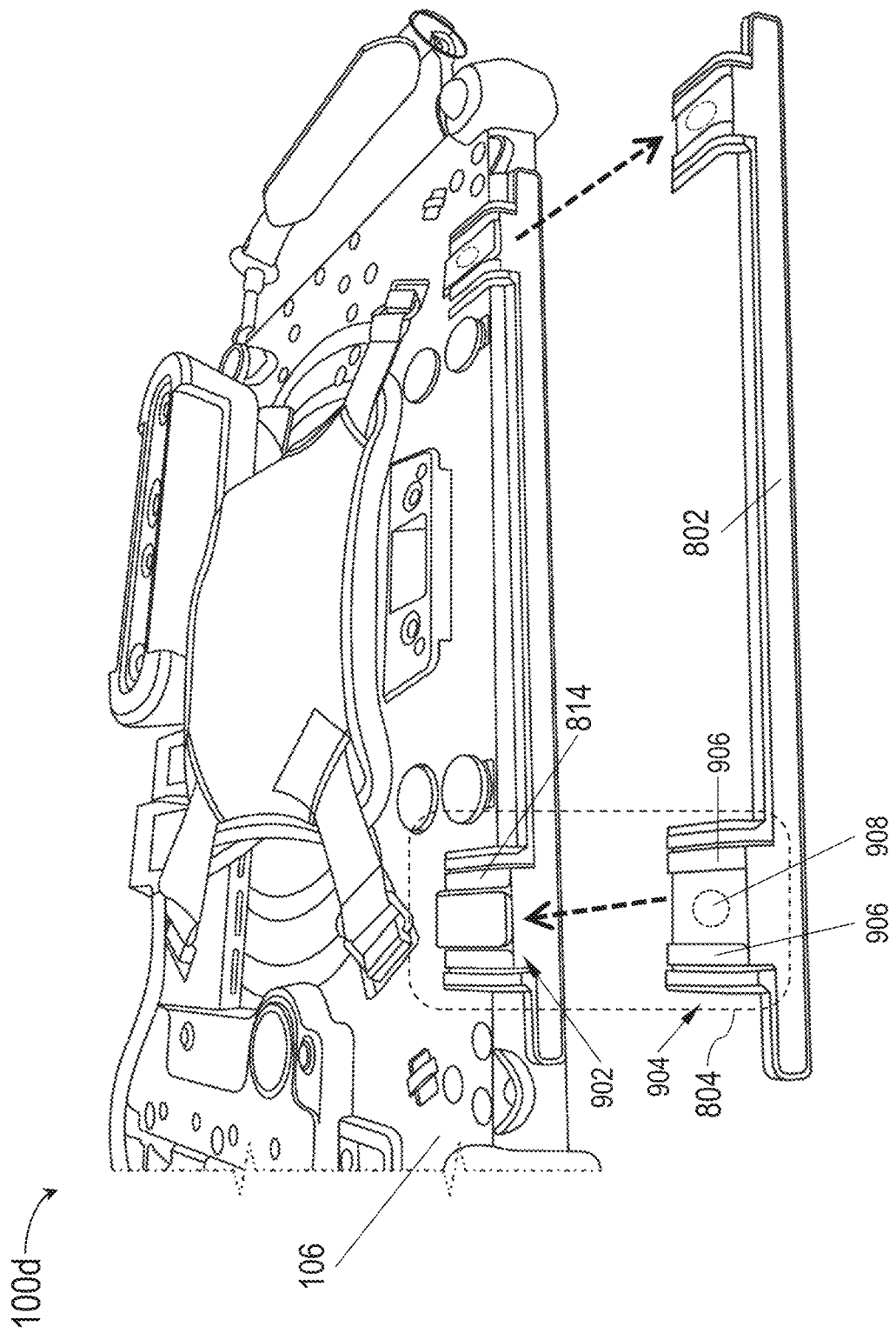
FIG. 9A is an external view of the modular ruggedized protective case of FIG. 1 illustrating attachment and detachment of the removable sidewall portion to/from the rigid secondary housing via snap-on points.
Figure 9B:
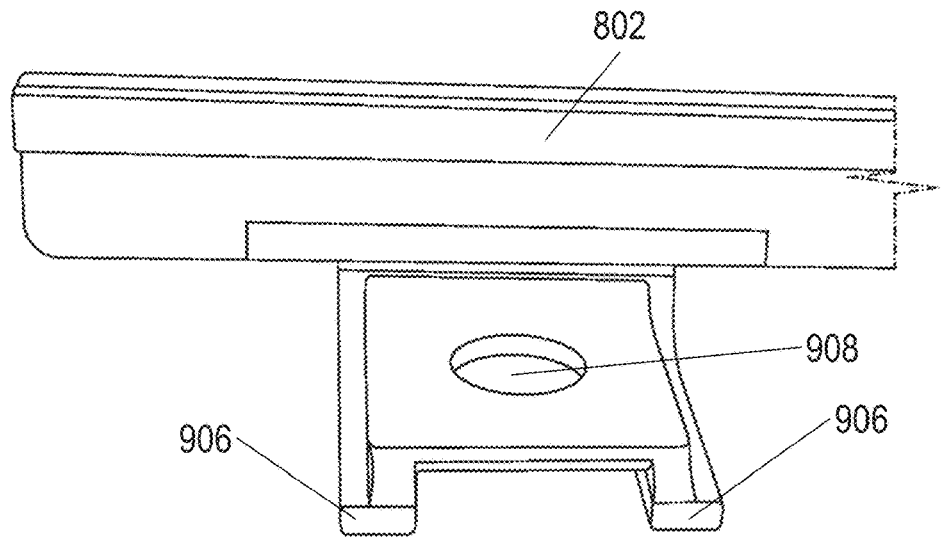
FIGS. 9B and 9C are detailed views of a sidewall portion of a snap-on point of FIG. 9A.
Figure 9C:
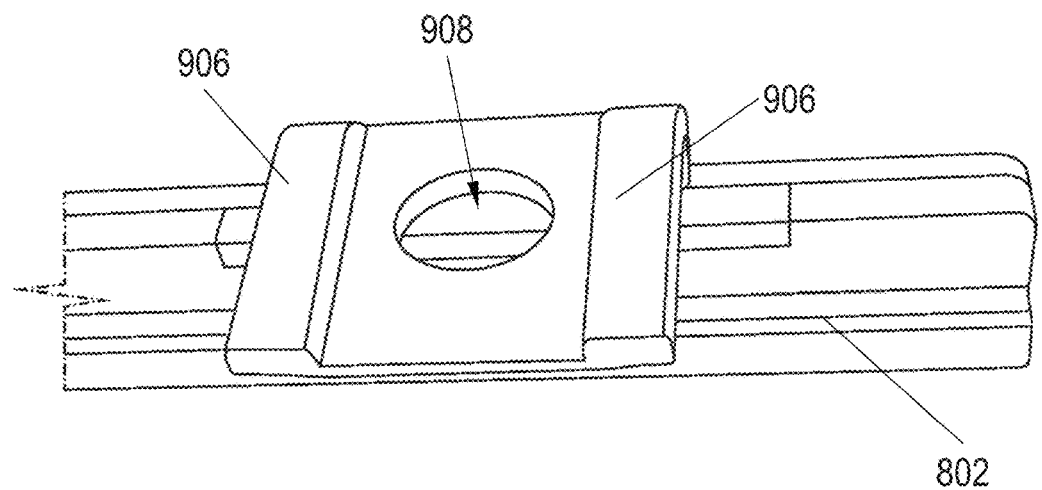
Figure 9D:
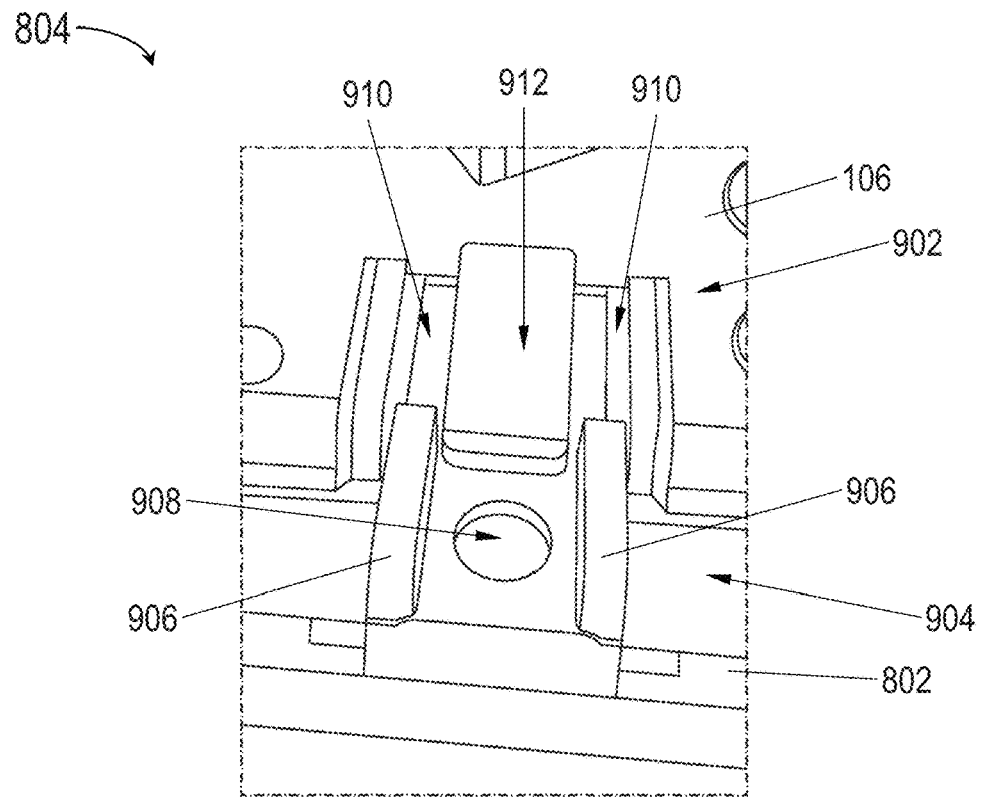
FIGS. 9D and 9E are external views of the attachment/detachment of the removable sidewall to/from the secondary housing of FIG. 9A.
Figure 9E:
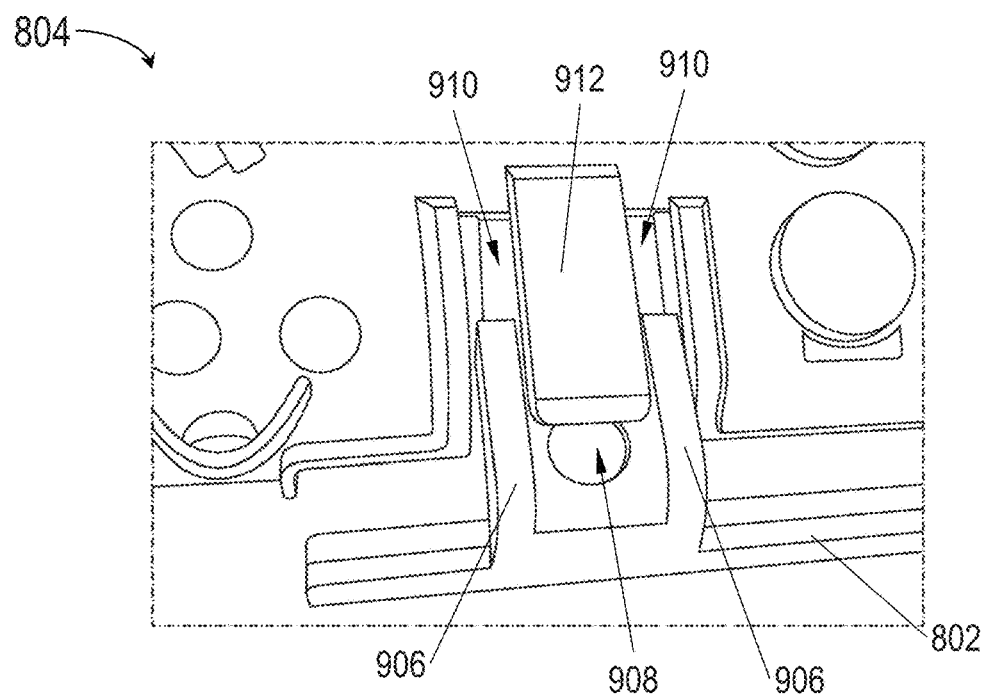
Figure 9H:
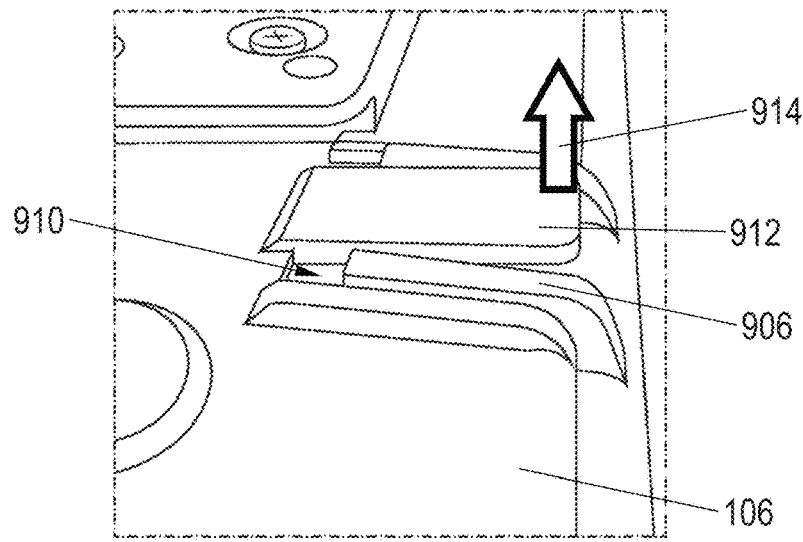
FIGS. 9H through 9K are external views of the attachment/detachment process of FIG. 9G.
Figure 9I:
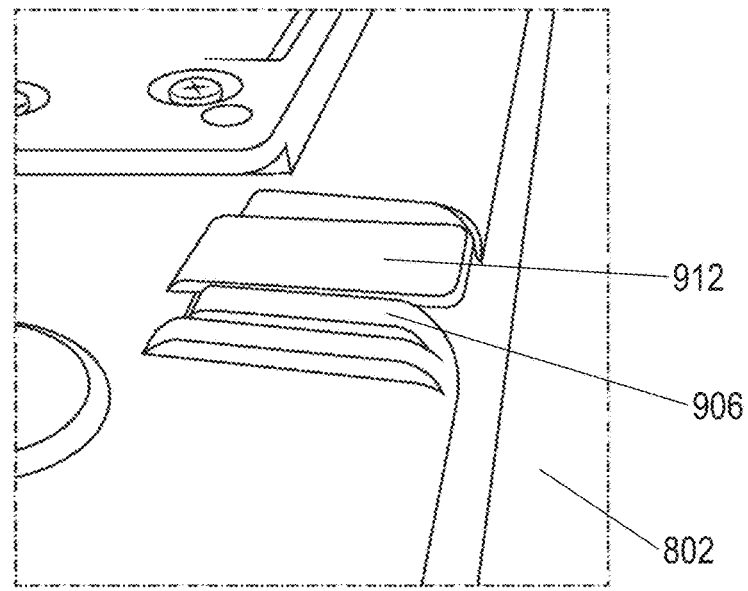
Figure 9J:
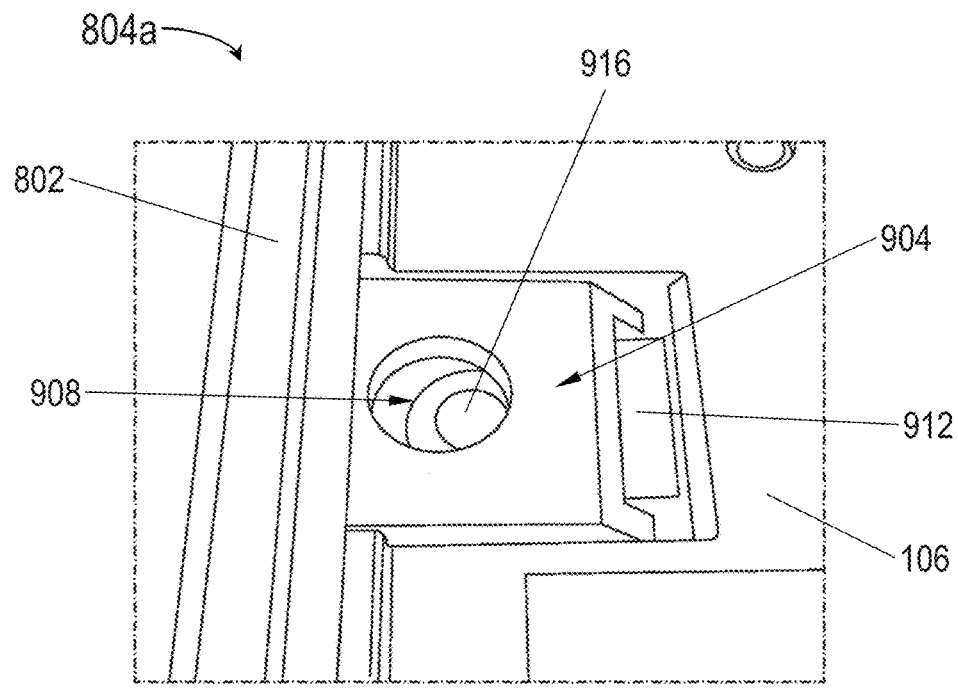
Figure 9K:
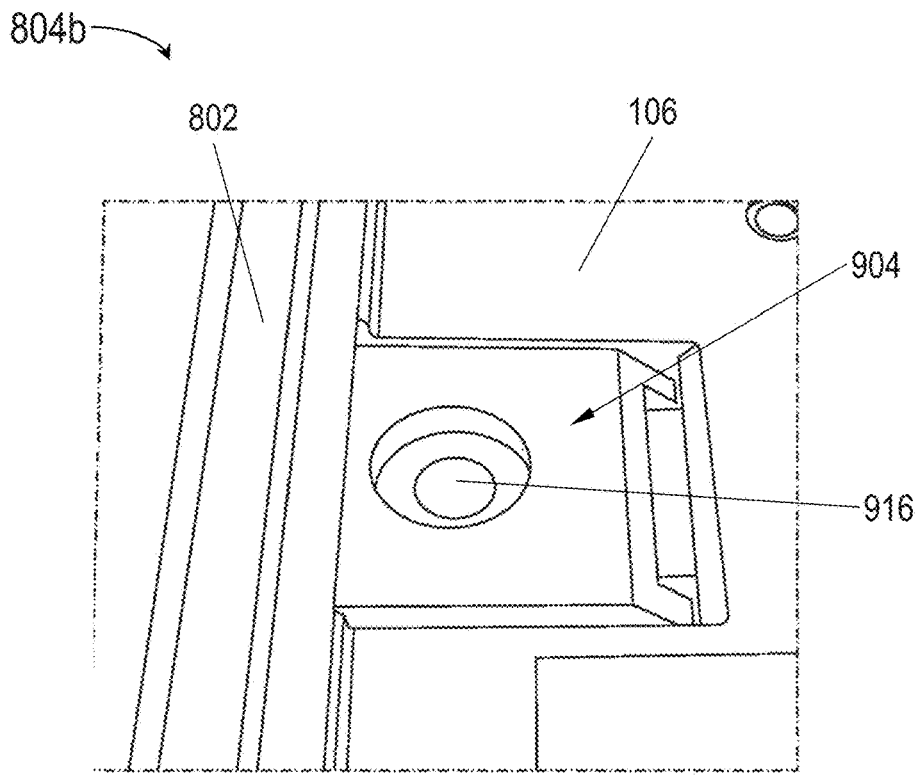

Referring now to FIGS. 9D and 9E, the housing portion 902 may include receiving slots 910 on either side of a tab 912. For example, the tab 912 may have a forward end and a rear end attached to or extending from the secondary housing 106. In embodiments, the tab 912 may be fashioned of the same rigid material as the secondary housing 106, but sufficiently flexible that the outer tab (912; e.g., the portion substantially flush with the rear face of the secondary housing) may be engaged (914; see FIG. 9G) by a user. For example, when the removable sidewall 802 is securely attached to the secondary housing 106, the user may raise (914) the tab 912 upward at the forward end to disengage the tab 912 from the hole 908, allowing the removable sidewall to be detached from the secondary housing. Similarly, when the removable sidewall 802 is attached to the secondary housing 106, the rails 906 may translate along the receiving slots 910, guiding the sidewall portion 904 into the housing portion 902 and the hole 908 into engagement with an inner portion of the tab 912 as described below, securely attaching the removable sidewall to the secondary housing.

Referring now to FIG. 9F, the housing portion 902 is shown.

In embodiments, the housing portion 902 may include an inner tab 916 extending or projecting underneath the tab 912. For example, the inner tab 916 may be shaped like a disk or otherwise shaped to match the hole 908. The inner tab 916 may have a forward end 916a and a rear end 916b such that the rear end extends further from the underside of the tab 912 than the forward end.

Referring also to FIGS. 9G through 9K, the housing portion 902 and sidewall portion 904 of the snap-on point 804 are shown. In embodiments, as the sidewall portion 904 is inserted (snap-on point 804a) into the housing portion 902 and the rails 906 are guided by the receiving slots 910, the sidewall portion may drive the tab 912 upward until the hole 908 reaches the rear end 916b of the inner tab 916, and the inner tab locks into the hole, securing the removable sidewall 802 to the secondary housing 106 (snap-on point 804b). In embodiments, the tab 912 may be raised at its forward end to disengage the inner tab 916 from the hole 908, such that the sidewall portion 904 may be detached from the housing portion 902 and the removable sidewall 802 detached from the secondary housing 106.

Figure 10:
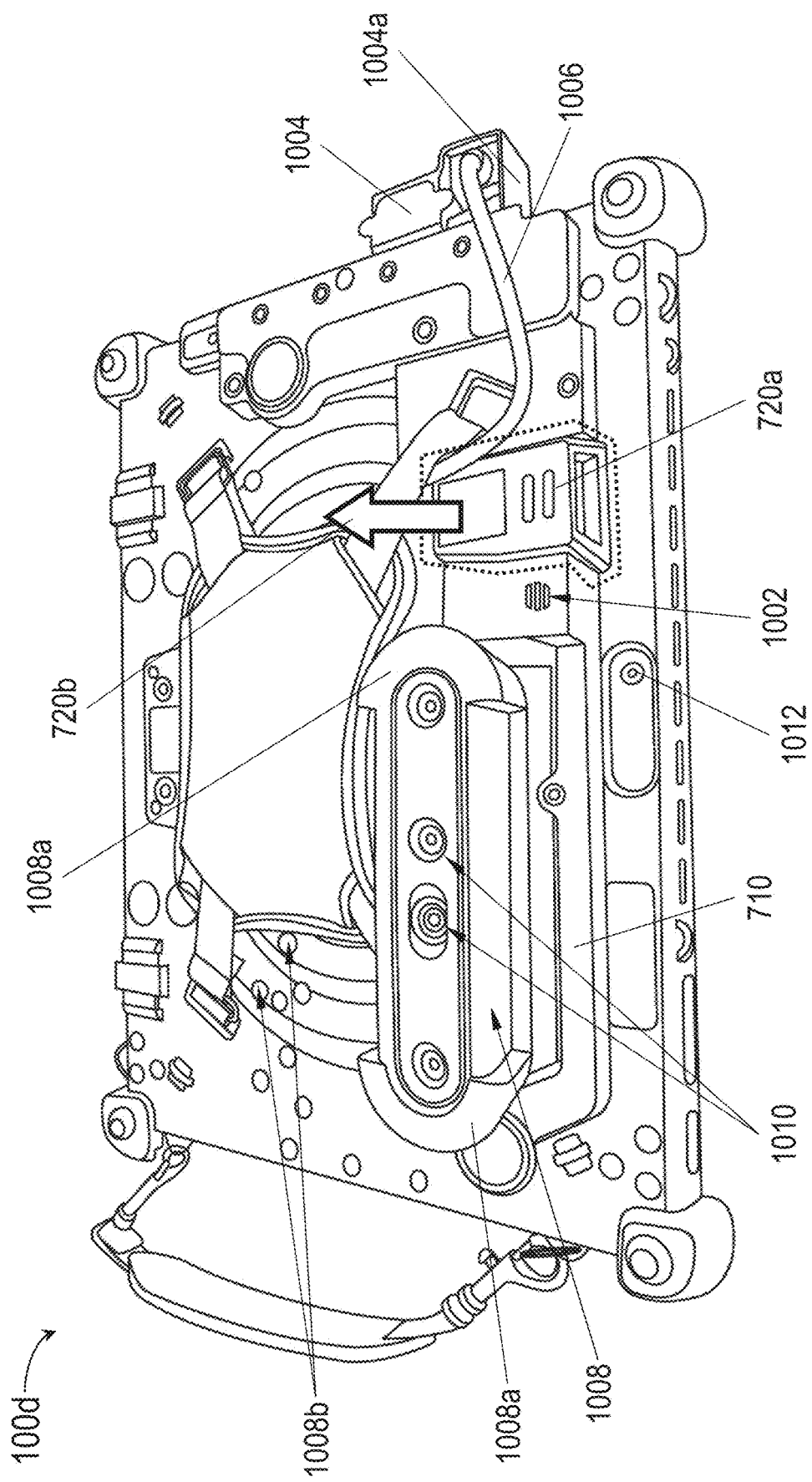
FIG. 10 is an external view of the modular ruggedized protective case of FIG. 1 illustrating external peripheral devices and a modular communications hub.

Referring now to FIG. 10, the modular ruggedized protective case 100d is shown.

In embodiments, the barcode scanner module 720a connected to the mobile device (102, FIG. 1) via the circuit housing 710 may be implemented and may function similarly to the barcode scanner module 720 shown by FIGS. 7C and 7D, except that the barcode scanner module 720a may additionally incorporate a speaker 1002 for providing auditory alerts in response to task completions or other events related to operations of the barcode scanner module 720a or other peripheral devices attached to the protective case 100d and/or in communication with the mobile device 102. For example, the speaker 1002 may emit an auditory alert indicative of a successful scanning operation, and a different auditory alert indicative of an unsuccessful scanning operation. In some embodiments, the barcode scanner module 720a may emit auditory alerts without the incorporation of an external speaker 1002.

In some embodiments, the barcode scanner module 720a may incorporate an external housing removable (720b) from the circuit housing 710 to allow installation of a broader variety of barcode scanner types to the circuit housing. For example, the barcode scanner 720, 720a may be replaced with a more compact or low-cost model if desired, or swapped out for a larger barcode scanner module incorporating an external speaker 1002 or other components and capabilities.

In some embodiments, the modular ruggedized protective case 100d may incorporate an external communications hub 1004 (e.g., USB hub). For example, the external communications hub 1004 may be incorporated anywhere on the secondary housing 106, e.g., on an edge adjacent to the rear face. Further, in embodiments the external communications hub 1004 may be configured to accept any number of peripheral devices, e.g., of USB 3.0 and/or USB-C type, via USB 3.0/USB-C ports (not shown) capable of operatively and communicatively connecting the peripheral devices to the internal processors of the mobile device 102. For example, some mobile devices 102 may be configured with built-in legacy USB ports, which precludes direct connection to newer Android/iOS-type mobile devices configured for combined power and data transfer via USB-C, or for high-speed data transfer via USB 3.0. Even if the mobile device 102 itself provided for power and data transfer via a single USB-C port, the use of that port for permanent attachment of a peripheral device would otherwise preclude the use of that USB-C port for recharging the mobile device. Accordingly, the external communications hub 1004 may provide additional USB-C or USB 3.0 ports (not shown) via which peripheral devices may be connected for high-speed data transfer or for combined data link/power supply via physical cable 1006 (e.g., USB-C, USB 3.0) without occupying an existing USB-C/USB 3.0 port, if one exists (or without disturbing the circuit housing 710 and any USB 3.0/USB-C peripheral devices attached thereto).

In some embodiments, the modular ruggedized protective case 100d may incorporate a peripheral mount 1008 incorporating a three-dimensional (3D) imager 1010. For example, the peripheral mount 1008 may be surrounded by a protective boot 1008a (e.g., fashioned of rubber or other like lightweight, flexible, shock absorbing material) capable of protecting the 3D imager 1010 and other peripherals housed by the peripheral mount from impacts and shocks. Further, the peripheral mount 1008 may be fastened to the rear face of the secondary housing 106, e.g., via pre-existing screw holes 1008b set into the rear face, and the 3D imager 1010 connected via USB 3.0 cable 1006 to the external communications hub 1004 (or, e.g., to a suitable USB 3.0/USB-C port 1004a of the mobile device 102, if one exists). Accordingly, the 3D imager 1010 may be configured for high-speed data transfer of 3D imaging datasets of gigabyte size or larger to the mobile device 102 for further processing. Alternatively, the 3D imager 1010, or other USB 3.0/USB-C peripheral devices compatible with the peripheral mount 1008, may be configured for data transfer and operating power supply via the physical cable 1006 and external communications hub 1004.

In some embodiments, the peripheral mount 1008 may allow the 3D imager 1010 to partially obstruct a component imaging device 1012 (e.g., a 2D camera incorporated into the mobile device 102), so as to provide for the 3D imager a field of view similar to the field of view of the component imaging device. Accordingly, the peripheral mount 1008 may be configured for quick attachment to, and detachment from, the secondary housing 106 in order to quickly and easily restore unobstructed use of the component imaging device 1012.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A modular ruggedized protective case for a mobile communications device, comprising:
   a primary housing configured to at least partially enclose one or more of an edge of a mobile communications device and a first rear face of the mobile communications device, the primary housing fashioned of a flexible material;
   a secondary housing configured to at least partially enclose the primary housing, the secondary housing fashioned of a rigid material;
   and
   a removable sidewall configured for attachment to and detachment from the secondary housing via at least one snap-on point, the removable sidewall fashioned of a rigid material similar to that of the secondary housing, the removable sidewall conforming to the exterior surface of the secondary housing and configured to conceal at least one connector port set into the mobile communications device, the at least one connector port configured for physically and communicatively coupling a peripheral keyboard to the mobile communications device;

wherein each snap-on point comprises a sidewall portion of the removable sidewall configured for engagement with a housing portion of the secondary housing, the housing portion comprising:
   a pair of receiving slots on either side of a tab, the tab comprising an outer tab extending from the secondary housing and an inner tab under the outer tab, the inner tab having a forward end and a rear end extending farther from the outer tab than the forward end;

the sidewall portion comprising:
   a pair of rails configured to translate along the receiving slots as the removable sidewall is attached or detached;
   and
   a hole extending through the sidewall portion between the pair of rails and conforming to the inner tab, the inner tab configured to lock into the hole when the hole extends beyond the rear end;
and
wherein the outer tab is configured for engagement by a user to release the inner tab from the hole.

2. The modular ruggedized protective case of claim 1, wherein:
the removable sidewall comprises at least one first magnet either attached thereto or set thereinto;
and
the secondary housing comprises at least one second magnet either attached thereto or set thereinto, the at least one first magnet and the at least one second magnet mutually attractive;
the removable sidewall secured to the secondary housing by the at least one first magnet and the at least one second magnet.

3. The modular ruggedized protective case of claim 1, wherein the removable sidewall includes at least one type cover adapter externally attached thereto and operatively coupled to the at least one connector port, the at least one type cover adapter configured to engage with the peripheral keyboard and to operatively couple the peripheral keyboard to the mobile communications device via the at least one connector port.

4. The modular ruggedized protective case of claim 1, further comprising:
at least one peripheral device attached to a second rear face of the secondary housing, the at least one peripheral device communicatively coupled to the mobile communications device and operable via the mobile communications device.

5. The modular ruggedized protective case of claim 4, wherein the at least one peripheral device includes a scanner configured to:
emit a first auditory alert in response to a successful scanning operation by the scanner;
and
emit a second auditory alert in response to an unsuccessful scanning operation by the scanner.

6. The modular ruggedized protective case of claim 5, wherein the scanner includes a speaker configured for emitting the first and second auditory alerts.

7. The modular ruggedized protective case of claim 5, further comprising:
at least one external communications hub attached to the secondary housing, the external communications hub including at least one communications port operatively coupled to the mobile communications device;
and
at least one physical cable connecting the communications port to the at least one peripheral device.

8. The modular ruggedized protective case of claim 7, wherein the at least one physical cable and the at least one communications port are associated with at least one of a USB 3.0 connection or a USB-C connection.

9. The modular ruggedized protective case of claim 4, wherein the at least one peripheral device includes at least one three-dimensional (3D) imaging device housed in a camera mount attached to the second rear face.

* * * * *